(12) United States Patent
Obrecht et al.

(10) Patent No.: US 7,662,889 B2
(45) Date of Patent: Feb. 16, 2010

(54) PROCESS FOR THE METATHETIC DEGRADATION OF NITRILE RUBBERS

(75) Inventors: Werner Obrecht, Moers (DE); Julia Maria Müller, Blaustein (DE); Oskar Nuyken, München (DE); Monika Kellner, München (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/895,991

(22) Filed: Aug. 28, 2007

(65) Prior Publication Data

US 2008/0076881 A1    Mar. 27, 2008

(30) Foreign Application Priority Data

Aug. 30, 2006    (DE) ................. 10 2006 040 569

(51) Int. Cl.
*C08C 19/08* (2006.01)
*C08C 19/02* (2006.01)

(52) U.S. Cl. .............. 525/329.3; 525/338; 525/340; 525/370; 525/375; 525/329.1

(58) Field of Classification Search .......... 525/329.1, 525/329.3, 338, 340, 370, 375
See application file for complete search history.

(56) References Cited

U.S. PATENT DOCUMENTS

| | | | | |
|---|---|---|---|---|
| 3,700,637 | A | 10/1972 | Finch, Jr. | 260/83.3 |
| 4,019,130 | A | 4/1977 | Sakamoto et al. | 324/34 R |
| 4,464,515 | A | 8/1984 | Rempel et al. | 525/338 |
| 4,503,196 | A | 3/1985 | Rempel et al. | 525/338 |
| 4,581,417 | A | 4/1986 | Buding et al. | 525/338 |
| 4,631,315 | A | 12/1986 | Buding et al. | 525/338 |
| 4,795,788 | A | 1/1989 | Himmler et al. | 525/338 |
| 4,812,528 | A | 3/1989 | Rempel et al. | 525/338 |
| 4,978,771 | A | 12/1990 | Fiedler et al. | 558/459 |
| 6,683,136 | B2 | 1/2004 | Guo et al. | 525/329.3 |
| 2002/0107138 | A1 | 8/2002 | Hoveyda et al. | 502/152 |
| 2004/0127647 | A1* | 7/2004 | Ong et al. | 525/191 |
| 2004/0132891 | A1 | 7/2004 | Ong et al. | 524/492 |
| 2007/0049700 | A1* | 3/2007 | Obrecht et al. | 525/329.1 |

FOREIGN PATENT DOCUMENTS

| | | |
|---|---|---|
| DE | 25 39 132 | 3/1977 |
| EP | 0 419 952 | 4/1991 |
| EP | 0 471 250 | 2/1992 |
| WO | 96/04289 | 2/1996 |
| WO | 97/06185 | 2/1997 |
| WO | 00/71554 | 11/2000 |
| WO | 02/100905 | 12/2002 |
| WO | 02/100941 | 12/2002 |
| WO | 03/002613 | 1/2003 |
| WO | 2004/035596 | 4/2004 |

OTHER PUBLICATIONS

J. Am. Chem. Society 1997, 119, 3887-3897, Dias, Nguyen and Grubbs "Well-Defined Ruthenium Olefin Metathesis Catalysts: Mechanism and Activity" XP002433026.
Angew. Chem. Int. Ed., 2003, 42, 4592-4633; Richard R. Schrock and Amir H. Hoveyda; "Molybdenum and Tungsten Imido Alkylidene Complexes as Efficient Olefin-Metathesis Catalysts".
Eur. J. Org. Chem. 2003, 963-966; Karol Grela and Mikhail Kim; A Good Bargain: An inexpensive, Air-Stable Ruthenium Metathesis Catalyst Derived from α-Asarone.
Angew. Chem. Int. Ed. 2002, 41, 4038-4040; Karol Grela, Syuzanna Harutyunyan and Anna Michrowska; "A Highly Efficient Ruthenium Catalyst for Metathesis Reactions".
J. Org. Chem. 2004, 69, 6894-6896; Robert Bujok et al; "Ortho- and Para-Substituted Hoveyda-Grubbs Carbenes. An Improved Synthesis of Highly Efficient Metathesis Initiators".
Chem. Eur. J. 2004, 10, 777-784; Krause, Nuyken, Wurst and Buchmeiser; "Synthesis and Reactivity of Homogeneous and Heterogeneous Ruthenium-Based Metathesis Cataysts Containing Electron-Withdrawing Ligands".
Angew. Chem. Int. Ed. 2004, 43, 6161-6165; Patricio E. Romero, Warren E. Piers, and Robert McDonald; "Rapidly Initiating Ruthenium Olefin-Metathesis Catalysts" +.

* cited by examiner

*Primary Examiner*—Roberto Rábago
(74) *Attorney, Agent, or Firm*—Jennifer R. Seng

(57) ABSTRACT

An improved process for the metathetic degradation of nitrile rubber using catalyst systems comprising the catalyst and also a phosphane or diphosphane is provided.

37 Claims, No Drawings

PROCESS FOR THE METATHETIC DEGRADATION OF NITRILE RUBBERS

FIELD OF THE INVENTION

The invention relates to an improved process for the metathetic degradation of nitrile rubber in the presence of a catalyst and of a specific additive.

BACKGROUND OF THE INVENTION

The term nitrile rubber, also referred to as "NBR" for short, refers to rubbers which are copolymers or terpolymers of at least one α,β-unsaturated nitrile, at least one conjugated diene and, if desired, further copolymerizable monomers.

Hydrogenated nitrile rubber, also referred to as "HNBR" for short, is produced by hydrogenation of nitrile rubber. Accordingly, the C=C double bonds of the copolymerized diene units are entirely or partly hydrogenated in HNBR. The degree of hydrogenation of the copolymerized diene units is usually in the range from 50 to 100%.

Hydrogenated nitrile rubber is a specialty rubber which has very good heat resistance, excellent resistance to ozone and chemicals and excellent oil resistance.

The abovementioned physical and chemical properties of HNBR are combined with very good mechanical properties, in particular a high abrasion resistance. For this reason, HNBR has found widespread use in a variety of applications. HNBR is used, for example, for seals, hoses, belts and damping elements in the automobile sector, also for stators, oil well seals and valve seals in the field of oil production and also for numerous parts in the aircraft industry, the electronics industry, mechanical engineering and shipbuilding.

HNBR grades which are commercially available on the market usually have a Mooney viscosity (ML 1+4 at 100° C.) in the range from 55 to 105, which corresponds to a weight average molecular weight $M_w$ (method of determination: gel permeation chromatography (GPC) against polystyrene standards) in the range from about 200 000 to 500 000. The polydispersity indices PDI (PDI=$M_w/M_n$, where $M_w$ is the weight average molecular weight and $M_n$ is the number average molecular weight) measured here give information about the width of the molecular weight distribution and frequently have a value of 3 or above. The residual double bond content is usually in the range from 1 to 18% (determined by IR spectroscopy).

The processability of HNBR is greatly restricted by the relatively high Mooney viscosity. For many applications, it would be desirable to have an HNBR grade which has a lower molecular weight and thus a lower Mooney viscosity. This would greatly improve the processability.

Numerous attempts have been made in the past to shorten the chain length of HNBR by degradation. For example, it is possible to achieve a decrease in the molecular weight by thermomechanical treatment (mastication), e.g. on a roll mill or in a screw apparatus (EP-A-0 419 952). However, this thermomechanical degradation has the disadvantage that functional groups such as hydroxyl, keto, carboxylic acid and ester groups are incorporated into the molecule by partial oxidation and, in addition, the microstructure of the polymer is substantially altered.

The preparation of HNBR having low molar masses corresponding to a Mooney viscosity (ML 1+4 at 100° C.) in the range below 55 or a number average molecular weight of about $M_n$<200 000 g/mol was not possible by means of established production methods for a long time, since, firstly, a step increase in the Mooney viscosity occurs on hydrogenation of NBR and, secondly, the molar mass of the NBR feedstock to be used for the hydrogenation cannot be reduced at will, since otherwise work-up in the available industrial plants is no longer possible because of excessive stickiness. The lowest Mooney viscosity of an NBR feedstock which can be worked up without difficulties in an established industrial plant is about 30 Mooney units (ML 1+4 at 100° C.). The Mooney viscosity of the hydrogenated nitrile rubber obtained using such an NBR feedstock is in the order of 55 Mooney units (ML 1+4 at 100° C.). The Mooney viscosity is in each case determined in accordance with ASTM standard D1646.

In the more recent prior art, this problem is solved by reducing the molecular weight of the nitrile rubber before hydrogenation by degradation to a Mooney viscosity (ML 1+4 at 100° C.) of less than 30 Mooney units or a number-average molecular weight of $M_n$<70 000 g/mol. The decrease in the molecular weight is achieved here by means of a metathesis reaction in which low molecular weight 1-olefins are usually added. The metathesis reaction is advantageously carried out in the same solvent as the subsequent hydrogenation reaction, so that the degraded NBR feedstock does not have to be isolated from the solvent after the degradation reaction before it is subjected to the hydrogenation. To catalyse the metathetic degradation reaction, use is made of metathesis catalysts which are tolerant of polar groups, in particular nitrile groups WO-A-02/100905 and WO-A-02/100941 describe a process which comprises the degradation of nitrile rubber starting polymers by olefin metathesis and subsequent hydrogenation. Here, a nitrile rubber is reacted in a first step in the presence of a coolefin and a specific complex catalyst based on osmium, ruthenium, molybdenum or tungsten and the product is hydrogenated in a second step. In this way, it is possible to obtain hydrogenated nitrile rubbers having a weight average molecular weight ($M_w$) in the range from 30 000 to 250 000, a Mooney viscosity (ML 1+4 at 100° C.) in the range from 3 to 50 and a polydispersity index PDI of less than 2.5.

Metathesis catalysts are described in general terms in, for example, WO-A-96/04289 and WO-A-97/06185. The have the following in-principle structure:

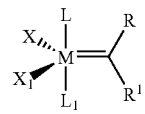

where M is osmium or ruthenium, R and $R^1$ are organic radicals having a large structural variety, X and $X_1$ are anionic ligands and L and $L_1$ are uncharged electron donors. In the literature, the customary term "anionic ligands" always refers, in the context of such metathesis catalysts, to ligands which, when they are regarded separately from the metal centre, would be negatively charged for a closed electron shell.

Such catalysts are described as suitable for ring-closing metatheses (RCM), cross-metatheses (CM) and ring-opening metatheses (ROMP).

The metathesis of nitrile rubber can be carried out successfully using catalysts from the group of "Grubbs (1) catalysts". An example of a suitable catalyst is the bis(tricyclohexylphosphine)benzylidene ruthenium dichloride catalyst shown below.

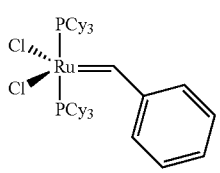

Grubbs (I) catalyst

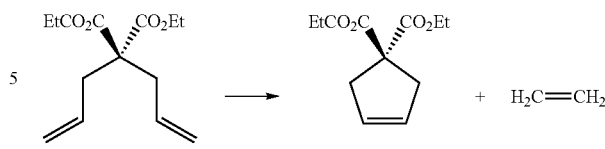

After metathesis and hydrogenation, the nitrile rubbers have a lower molecular weight and also a narrower molecular weight distribution than the hydrogenated nitrile rubbers which can be produced according to the prior art.

However, the amounts of Grubbs (I) catalyst employed for carrying out the metathesis are large. According to the examples in WO-A-03/002613, they are 307 ppm and 61 ppm of Ru. The reaction times required are also long and the molecular weights even after degradation are still relatively high (see Example 3 of WO-A-03/002613, where $M_w$=180 000 g/mol and $M_n$=71 000 g/mol).

US 2004/0127647 A1 describes blends based on low molecular weight HNBR rubbers having a bimodal or multimodal molecular weight distribution and also vulcanizates of these rubbers. To carry out the metathesis, 0.5 phr of Grubbs I catalyst, corresponding to 614 ppm of ruthenium, is used according to the examples.

Furthermore, WO-A-00/71554 discloses a group of catalysts which are described as "Grubbs (II) catalysts" in the art. If such a "Grubbs (U) catalyst", e.g. 1,3-bis(2,4,6-trimethylphenyl)-2-imidazolidenylidene)(tricyclohexylphosphine) ruthenium(phenylmethylene)dichloride, is used for the NBR metathesis, this occurs successfully even without use of a coolefin (US-A-2004/0132891). After the subsequent hydrogenation, which is carried out in situ, the hydrogenated nitrile rubber has lower molecular weights and a narrower molecular weight distribution (PDI) than when catalysts of the Grubbs (I) type are used. In terms of the molecular weight and the molecular weight distribution, the metathetic degradation using catalysts of the Grubbs II type proceeds more efficiently than that using catalysts of the Grubbs I type. However, the amounts of ruthenium necessary for this efficient metathetic degradation are still relatively high and long reaction times are still required.

Grubbs (II) catalyst

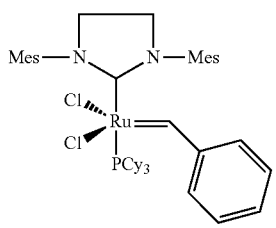

In all the abovementioned processes for the metathetic degradation of nitrile rubber, relatively large amounts of catalyst have to be used and long reaction times are required to produce the desired low molecular weight nitrile rubbers.

In J. Am. Chem. Soc. 1997, 119, 3887-3897, it is stated that in the following ring-closing metathesis of diethyl diallylmalonate the activity of the catalysts of the Grubbs I type can be increased by additions of CuCl and $CuCl_2$. This increase in activity is explained by a shift in the dissociation equilibrium as a result of phosphane ligand dissociated from the Grubbs I catalyst being scavenged by the copper ions to form copper-phosphane complexes. However, it is stated in J. Am. Chem. Soc. 1997, 119, 3887-3897, that the addition of phosphanes in an amount of from 0.25 to 1.0 equivalent per 1 equivalent of the ruthenium-carbene complex results in a reduction in the reaction rate of the ring-closing metathesis.

It is therefore an object of the invention to find catalyst systems which have an increased activity when used in the metathetic degradation of nitrile rubbers in order to reduce the amounts of catalysts necessary, in particular the amounts of noble metal present, and decrease the reaction rate.

SUMMARY OF THE INVENTION

It has now been found that the activity of metathesis catalysts in the degradation of nitrile rubbers can be increased by using them in combination with a phosphane or diphosphane. This is all the more surprising because a person skilled in the art would not have expected this on the basis of J. Am. Chem. Soc. 1997, 119, 3887-3897.

DETAILED DESCRIPTION OF THE INVENTION

The invention accordingly provides a process for the metathetic degradation of nitrile rubber in the presence of a catalyst and a phosphane or a diphosphane, wherein 0.01-1 equivalent of the phosphane or diphosphane is used per 1 equivalent of catalyst.

For the purposes of the present patent application and invention, all general or preferred definitions of radicals, parameters or explanations mentioned below can be combined with one another in any way, i.e. also between the respective ranges and preferred ranges.

The term "substituted" used in the context of the present patent application with regard to the metathesis catalyst or the phosphanes or diphosphanes means that a hydrogen atom on an indicated radical or atom has been replaced by one of the groups indicated in each case, with the proviso that the valency of the indicated atom is not exceeded and the substitution leads to a stable compound.

Phosphanes used are usually those of the general formula (IA),

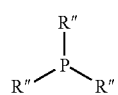

(IA)

where
all the radicals R" are identical or different and are each alkyl, alkenyl, alkadienyl, alkoxy, aryl, heteroaryl, cycloalkyl, cycloalkenyl, cycloalkadienyl, halogen or trimethylsilyl.

The radicals R" can be substituted further.

Diphosphanes used are usually those of the general formula (IB),

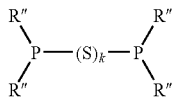

where
all the radicals R" are identical or different and have the same meanings as in the general formula (IA),
k is 0 or 1 and
S is a straight-chain or branched alkanediyl, alkenediyl or alkynediyl group.

Such phosphanes or diphosphanes of the general formulae (IA) and (IB) can be prepared by methods known to those skilled in the art or are commercially available.

The alkyl radicals in the radicals R" of the phosphanes and diphosphanes of the general formulae (IA) and (IB) are identical or different and are usually each a straight-chain or branched $C_1$-$C_{30}$-alkyl radical, preferably $C_1$-$C_{24}$-alkyl radical, particularly preferably $C_1$-$C_{18}$-alkyl radical. $C_1$-$C_{18}$-Alkyl encompasses, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, 1,1-dimethylpropyl, 1,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl, n-tridecyl, n-tetradecyl, n-hexadecyl and n-octadecyl.

All the abovementioned alkyl radicals are optionally substituted one or more times, for example by $C_5$-$C_{24}$-aryl radicals, preferably phenyl, halogen, preferably fluorine, chlorine or bromine, CN, OH, $NH_2$ or $NR'_2$ radicals, where R' can in turn be $C_1$-$C_{30}$-alkyl or $C_5$-$C_{24}$-aryl.

The alkenyl radicals in the radicals R" of the phosphanes and diphosphanes of the general formulae (IA) and (IB) are identical or different and are usually each $C_2$-$C_{30}$-alkenyl, preferably $C_2$-$C_{20}$-alkenyl. The alkenyl radical is particularly preferably a vinyl radical or an allyl radical.

The alkadienyl radicals in the radicals R" of the phosphanes and diphosphanes of the general formulae (IA) and (IB) are identical or different and are usually each $C_4$-$C_{30}$-alkadienyl, preferably $C_4$-$C_{20}$-alkadienyl. The alkadienyl radical is particularly preferably butadienyl or pentadienyl.

The alkoxy radicals in the radicals R" of the phosphanes and diphosphanes of the general formulae (IA) and (IB) are identical or different and are usually each $C_1$-$C_{20}$-alkoxy, preferably $C_1$-$C_{10}$-alkoxy, particularly preferably methoxy, ethoxy, n-propoxy, isopropoxy, n-butoxy, sec-butoxy, tert-butoxy, n-pentoxy and n-hexoxy.

The aryl radicals in the radicals R" of the phosphanes and diphosphanes of the general formulae (IA) and (IB) are likewise identical or different and are usually each a $C_5$-$C_{24}$-aryl radical, preferably $C_6$-$C_{14}$-aryl radical, particularly preferably $C_6$-$C_{12}$-aryl radical. Examples of $C_5$-$C_{24}$-aryl are phenyl, o-, p-, m-tolyl, naphthyl, phenanthrenyl, anthracenyl and fluorenyl.

These aryl radicals are optionally substituted one or more times, for example by straight-chain or branched $C_1$-$C_{30}$-alkyl (resulting in alkaryl radicals), halogen, preferably fluorine, chlorine or bromine, sulphonate ($SO_3Na$), straight-chain or branched $C_1$-$C_{30}$-alkoxy, preferably methoxy or ethoxy, hydroxy, $NH_2$ or $NR'_2$ radicals, where R' can in turn be straight-chain or branched $C_1$-$C_{30}$-alkyl or $C_5$-$C_{24}$-aryl, or by further $C_5$-$C_{24}$-aryl radicals so that one or more of the R" radicals are then a biphenyl or binaphthyl radical which may optionally in turn be substituted one or more times by any of the abovementioned substituents.

The heteroaryl radicals in the radicals R" of the phosphanes and diphosphanes of the general formulae (IA) and (IB) are identical or different and have the same meanings as the aryl radicals but have one or more of the skeletal carbon atoms replaced by a heteroatom selected from the group consisting of nitrogen, sulphur and oxygen. Examples of such heteroaryl radicals are pyridinyl, oxazolyl, benzofuranyl, dibenzofuranyl and quinolinyl.

The cycloalkyl radicals in the radicals R" of the phosphanes and diphosphanes of the general formulae (IA) and (IB) are identical or different and are usually each a $C_3$-$C_{20}$-cycloalkyl radical, preferably a $C_3$-$C_8$-cycloalkyl radical, particularly preferably cyclopentyl and cyclohexyl.

The cycloalkenyl radicals in the radicals R''' of the phosphanes and diphosphanes of the general formulae (IA) and (IB) are identical or different, have a C═C double bond in the ring and are usually $C_5$-$C_8$-cycloalkenyl, preferably cyclopentenyl and cyclohexenyl.

The cycloalkadienyl radicals in the radicals R''' of the phosphanes and diphosphanes of the general formulae (IA) and (103) are identical or different, have two C═C double bonds in the ring and are usually $C_5$-$C_8$-cycloalkadienyl, preferably cyclopentadienyl or cyclohexadienyl.

The halogen radicals in the radicals R" of the phosphanes and diphosphanes of the general formulae (IA) and (IB) are identical or different and are each fluorine, chlorine or bromine.

Particularly preferably phosphanes of the general formula (IA) are trialkylphosphanes, tricycloalkylphosphanes, triarylphosphanes, trialkarylphosphanes, triaralkylphosphanes, diarylmonoalkylphosphanes, diarylmonocycloalkylphosphanes, dialkylmonoarylphosphanes, dialkylmonocycloalkylphosphanes or dicycloalkylmonoarylphosphanes, where all the abovementioned radicals may in turn be substituted one or more times by the above-mentioned substituents.

Especial preference is given to phosphanes of the general formula (IA), in which the radicals R" are identical or different and are each phenyl, cyclohexyl, cyclohexenyl, cyclopentyl, cyclopentadienyl, phenylsulphonate or cyclohexylsulphonate.

Very particularly preferred phosphanes of the general formula (IA) are $PPh_3$, $P(p$-$Tol)_3$, $P(o$-$Tol)_3$, $PPh(CH_3)_2$, $P(CF_3)_3$, $P(p$-$FC_6H_4)_3$, $P(p$-$CF_3C_6H_4)_3$, $P(C_6H_4$—$SO_3Na)_3$, $P(CH_2C_6H_4$—$SO_3Na)_3$, $P(iso$-$Pr)_3$, $P(CHCH_3(CH_2CH_3))_3$, $P(cyclopentyl)_3$, $P(cyclohexyl)_3$, $P(neopentyl)_3$, $P(C_6H_5CH_2)(C_6H_5)_2$, $P(NCCH_2CH_2)_2(C_6H_5)$, $P[(CH_3)_3C]_2Cl$, $P[(CH_3)_3C]_2(CH_3)$, $P(tert$-$Bu)_2(biph)$, $P(C_6H_{11})_2Cl$, $P(CH_3)(OCH_2CH_3)_2$, $P(CH_2$═$CHCH_2)_3$, $P(C_4H_3O)_3$, $P(CH_2OH)_3$, $P(m$-$CH_3OC_6H_4)_3$, $P(C_6F_5)_3$, $P[(CH_3)_3Si]_3$, $P[(CH_3O)_3C_6H_2]_3$ where Ph is phenyl, Tol is tolyl, biph is biphenyl, Bu is butyl and Pr is propyl.

In the diphosphanes of the general formula (IB), k is 0 or 1, preferably 1.

S in the general formula (IB) is a straight-chain or branched alkanediyl, alkenediyl or alkynediyl group, preferably a straight-chain or branched $C_1$-$C_{20}$-alkanediyl, $C_2$-$C_{20}$-alkenediyl or $C_2$-$C_{20}$-alkynediyl group, particularly preferably a straight-chain or branched $C_1$-$C_8$-alkanediyl, $C_2$-$C_6$-alkenediyl or $C_2$-$C_6$-alkynediyl group.

$C_1$-$C_8$-Alkanediyl is a straight-chain or branched alkanediyl radical having from 1 to 8 carbon atoms. Particular preference is given to a straight-chain or branched alkanediyl radical having from 1 to 6 carbon atoms, in particular from 2 to 4 carbon atoms. Preferred alkanediyl radicals are methylene, ethylene, propylene, propane-1,2-diyl, propane-2,2-diyl, butane-1,3-diyl, butane-2,4-diyl, pentane-2,4-diyl and 2-methylpentane-2,4-diyl.

$C_2$-$C_6$-Alkenediyl is a straight-chain or branched alkenediyl radical having from 2 to 6 carbon atoms. Preference is given to a straight-chain or branched alkenediyl radical having from 2 to 4, particularly preferably 2 or 3, carbon atoms. Preferred alkenediyl radicals are: vinylene, allylene, prop-1-ene-1,2-diyl and but-2-ene-1,4-diyl.

$C_2$-$C_6$-Alkynediyl is a straight-chain or branched alkynediyl radical having from 2 to 6 carbon atoms. Preference is given to a straight-chain or branched alkynediyl radical having from 2 to 4, particularly preferably 2 or 3, carbon atoms. Preferred alkynediyl radicals are: ethynediyl and propynediyl.

Particularly preferred diphosphanes of the general formula (IB) are $Cl_2PCH_2CH_2PCl_2$, $(C_6H_{11})_2PCH_2P(C_6H_{11})$, $(CH_3)_2PCH_2CH_2P(CH_3)_2$, $(C_6H_5)_2PCCP(C_6H_5)_2$, $(C_6H_5)_2PCH=CHP(C_6H_5)_2$, $(C_6F_5)_2PCH_2CH_2P(C_6F_5)_2$, $(C_6H_5)_2P(CH_2)_4P(C_6H_5)_2$, $(C_6H_5)_2PCH(CH_3)CH(CH_3)P(C_6H_5)_2$ and $(C_6H_5)_2PCH(CH_3)CH_2P(C_6H_5)_2$.

The phosphane or diphosphane is used in an amount in the range from 0.01 to 1 equivalent, preferably in an amount in the range from 0.05 to 0.5 equivalent and particularly preferably in an amount in the range from 0.10 to 0.20 equivalent, of phosphane or diphosphane, in each case based on 1 equivalent of the metathesis catalyst.

The phosphanes or diphosphanes of the general formulae (IA) and (IB) are added to the metathesis reaction from the outside in the process of the invention.

As a result of the addition according to the invention of the phosphanes or diphosphanes, an increase in activity in the metathetic degradation of nitrile rubbers is obtained for all known metathesis catalysts.

Catalysts used in the process of the invention are compounds of the general formula (A),

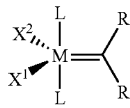

(A)

where

M is osmium or ruthenium, the radicals R are identical or different and are each alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_5$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_5$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_5$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, each of which may optionally be substituted by one or more alkyl, halogen, alkoxy, aryl or heteroaryl radicals, $X^1$ and $X^2$ are identical or different and are two ligands, preferably anionic ligands, and L are identical or different ligands, preferably uncharged electron donors.

In the catalysts of the general formula (A) $X^1$ and $X^2$ are identical or different and are two ligands, preferably anionic ligands.

$X^1$ and $X^2$ are usually hydrogen, halogen, pseudohalogen, straight-chain or branched $C_1$-$C_{30}$-alkyl, $C_5$-$C_{24}$-aryl, $C_1$-$C_{20}$-alkoxy, $C_5$-$C_{24}$-aryloxy, $C_3$-$C_{20}$-alkyldiketonate, $C_5$-$C_{24}$-aryldiketonate, $C_1$-$C_{20}$-carboxylate, $C_1$-$C_{20}$-alkylsulphonate, $C_5$-$C_{24}$-arylsulphonate, $C_1$-$C_{20}$-alkylthiol, $C_5$-$C_{24}$-arylthiol, $C_1$-$C_{20}$-alkylsulphonyl or $C_1$-$C_{20}$-alkylsulphinyl.

The abovementioned radicals $X^1$ and $X^2$ may be substituted by one or more further radicals, for example by halogen, preferably fluorine, straight-chain or branched $C_1$-$C_{10}$-alkyl, $C_1$-$C_{10}$-alkoxy or $C_5$-$C_{24}$-aryl, where these radicals may in turn be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (A), L represents identical or different ligands, preferably uncharged electron donors.

The two ligands L can, for example, each be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to the two ligands L each being, independently of one another, a $C_5$-$C_{24}$-arylphosphine, $C_1$-$C_5$-alkylphosphine or $C_3$-$C_{20}$-cycloalkylphosphine ligand, a $C_5$-$C_{24}$-arylsulphonated or $C_1$-$C_{10}$-alkylsulphonated phosphine ligand, a $C_5$-$C_{24}$-arylphosphinite or $C_1$-$C_{10}$-alkylphosphinite ligand, a $C_5$-$C_{24}$-arylphosphonite or $C_1$-$C_{10}$-alkylphosphonite ligand, a $C_5$-$C_{24}$-aryl phosphite or $C_1$-$C_{10}$-alkyl phosphite ligand, a $C_5$-$C_{24}$-arylarsine or $C_1$-$C_{10}$-alkylarsine ligand, a $C_5$-$C_{24}$-arylamine or $C_1$-$C_{10}$-alkylamine ligand, a pyridine ligand, a $C_5$-$C_{24}$-alkyl sulphoxide ligand, a $C_5$-$C_{24}$-aryl ether or $C_1$-$C_{10}$-alkyl ether ligand or a $C_5$-$C_{24}$-arylamide or $C_1$-$C_{10}$-alkylamide ligand, each of which may be substituted by a phenyl group which may in turn be substituted by a halogen, $C_1$-$C_5$-alkyl or $C_1$-$C_5$-alkoxy radical.

The meaning of phosphine includes, for example, $PPh_3$, $P(p-Tol)_3$, $P(o-Tol)_3$, $PPh(CH_3)_2$, $P(CF_3)_3$, $P(p-FC_6H_4)_3$, $P(p-CF_3C_6H_4)_3$, $P(C_6H_4-SO_3Na)_3$, $P(CH_2C_6H_4-SO_3Na)_3$, $P(iso-Pr)_3$, $P(CHCH_3(CH_2CH_3))_3$, $P(cyclopentyl)_3$, $P(cyclohexyl)_3$ and $P(neopentyl)_3$, where Ph is phenyl, Tol is tolyl and Pr is propyl.

Phosphinite includes, for example, triphenyl phosphinite, tricyclohexyl phosphinite, triisopropyl phosphinite and methyl diphenylphosphinite.

Phosphite includes, for example, triphenyl phosphite, tricyclohexyl phosphite, tri-tert-butyl phosphite, triisopropyl phosphite and methyl diphenyl phosphite.

Stibine includes, for example, triphenylstibine, tricyclohexylstibine and trimethylstibene.

Sulphonate includes, for example, trifluoromethanesulphonate, tosylate and mesylate.

Sulphoxide includes, for example, $CH_3S(=O)CH_3$ and $(C_6H_5)_2SO$.

Thioether includes, for example, $CH_3SCH_3$, $C_6H_5SCH_3$, $CH_3OCH_2CH_2SCH_3$ and tetrahydrothiophene.

The imidazolidine radical (Im) usually has a structure of the general formula (IIa) or (IIb),

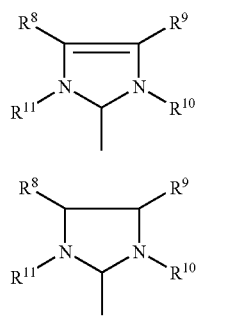

where
$R^8, R^9, R^{10}, R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{20}$-aryloxy, $C_2$-$C_{20}$-alkoxycarbonyl, $C_1$-$C_{20}$-alkylthio, $C_5$-$C_{20}$-arylthio, $C_1$-$C_{20}$-alkylsulphonyl, $C_1$-$C_{20}$-alkylsulphonate, $C_5$-$C_{20}$-arylsulphonate or $C_1$-$C_{20}$-alkylsulphinyl.

One or more of the radicals $R^8, R^9, R^{10}, R^{11}$ may, independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_5$-$C_{24}$-aryl, where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

In a preferred embodiment of the catalysts of the general formula (A), $R^8$ and $R^9$ are each, independently of one another, hydrogen, $C_5$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a further preferred embodiment of the catalysts of the general formula (B), the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

The abovementioned radicals $R^{10}$ and $R^{11}$ may be substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl, neopentyl, adamantyl or mesityl.

A variety of representatives of the catalysts of the formula (A) are known in principle, e.g. from WO-A-96/04289 and WO-A-97/06185.

Particular preference is given to the two ligands L in the general formula (A) being identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

Particular preference is also given to one ligand L in the general formula (A) being a trialkylphosphine ligand in which at least one of the alkyl groups is a secondary alkyl group or a cycloalkyl group, preferably isopropyl, isobutyl, sec-butyl, neopentyl, cyclopentyl or cyclohexyl.

Two very particularly preferred catalysts which come under the general formula (A) have the following structures (iii) (Grubbs (i) catalyst) and (IV) (Grubbs (II) catalyst), where Cy is cyclohexyl and Mes is in each case a 2,4,6-trimethylphenyl radical.

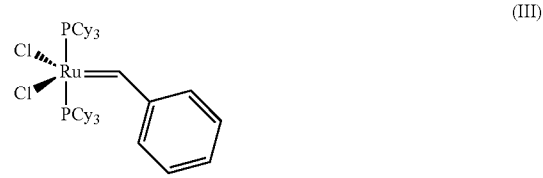

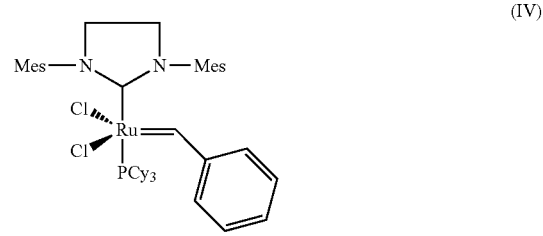

Further catalysts which can be used in the process of the invention are catalysts of the general formula (B),

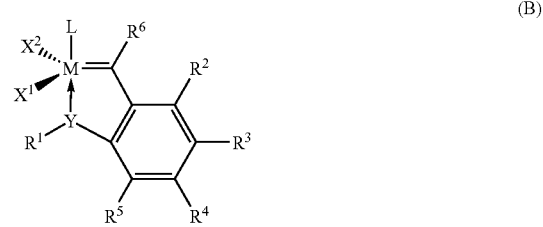

where
M is ruthenium or osmium,

Y is oxygen (O), sulphur (S), a radical N—$R^1$ or a radical P—$R^1$, where $R^1$ is as defined below, $X^1$ and $X^2$ are identical or different, preferably anionic ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, $R^6$ is hydrogen or an alkyl, alkenyl, alkynyl or aryl radical and L is a ligand as defined for the general formula (A).

The catalysts of the general formula (B) are known in principle. Representatives of this class of compounds are the catalysts described by Hoveyda et al. in US 2002/0107138 A1 and Angew Chem. Int. Ed. 2003, 42, 4592, and the catalysts described by Grela in WO-A-2004/035596, Eur. J. Org. Chem. 2003, 963-966 and Angew. Chem. Int. Ed. 2002, 41, 4038 and also J. Org. Chem. 2004, 69, 6894-96 and Chem. Eur. J 2004, 10, 777-784. These catalysts are commercially available or can be prepared as described in the references indicated.

In the catalysts of the general formula (B), L is a ligand which usually has an electron donor function and can have the same general, preferred and particularly preferred meanings as L in the general formula (A).

Furthermore, L in the general formula (B) is preferably a $P(R^7)_3$ radical, where the radicals $R^7$ are each, independently of one another, $C_1$-$C_6$-alkyl, $C_3$-$C_8$-cycloalkyl or aryl or else a substituted or unsubstituted imidazolidine radical ("Im") of the general formula (IIa) or (IIb).

$C_1$-$C_6$-Alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

$C_3$-$C_8$-Cycloalkyl encompasses cyclopropyl, cyclobutyl, cyclopentyl, cyclohexyl, cycloheptyl and cyclooctyl.

Aryl is an aromatic radical having from 5 to 24 skeletal carbon atoms. As preferred monocyclic, bicyclic or tricyclic carbocyclic aromatic radicals having from 6 to 10 skeletal carbon atoms, mention may be made of, for example, phenyl, biphenyl, naphthyl, phenanthrenyl or anthracenyl.

The imidazolidine radical (Im) usually has a structure of the general formula (IIa) or (IIb),

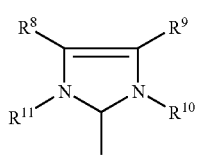
(IIa)

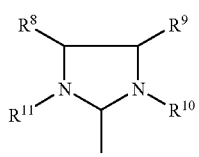
(IIb)

where $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{20}$-aryloxy, $C_2$-$C_{20}$-alkoxycarbonyl, $C_1$-$C_{20}$-alkylthio, $C_5$-$C_{20}$-arylthio, $C_1$-$C_{20}$-alkylsulphonyl, $C_1$-$C_{20}$-alkylsulphonate, $C_5$-$C_{20}$-arylsulphonate or $C_1$-$C_{20}$-alkylsulphinyl.

One or more of the radicals $R^8$, $R^9$, $R^{10}$, $R^{11}$ may, independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_5$-$C_{24}$-aryl, where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

In a preferred embodiment of the catalysts of the general formula (B), $R^8$ and $R^9$ are each, independently of one another, hydrogen, $C_5$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may in turn be substituted by one or more further substituents selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the catalysts of the general formula (B), the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

The abovementioned radicals $R^{10}$ and $R^{11}$ may be substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl, neopentyl, adamantyl or mesityl.

Particularly preferred imidazolidine radicals (Im) have the following structures (Va-f), where Mes is in each case a 2,4,6-trimethylphenyl radical,

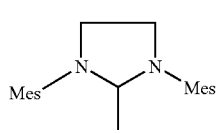
(Va)

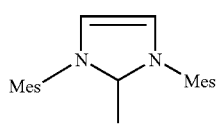
(Vb)

-continued

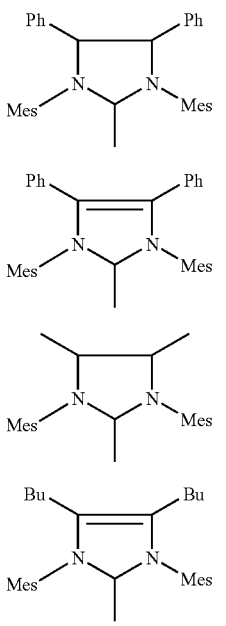

(Vc)

(Vd)

(Ve)

(Vf)

In the catalysts of the general formula (B), $X^1$ and $X^2$ are identical or different and can each be, for example, hydrogen, halogen, pseudohalogen, straight-chain or branched $C_1$-$C_{30}$-alkyl, $C_5$-$C_{24}$-aryl, $C_1$-$C_{20}$-alkoxy, $C_5$-$C_{24}$-aryloxy, $C_3$-$C_{20}$-alkyldiketonate, $C_5$-$C_{24}$-aryldiketonate, $C_1$-$C_{20}$-carboxylate, $C_1$-$C_{20}$-alkylsulphonate, $C_5$-$C_{24}$-arylsulphonate, $C_1$-$C_{20}$-alkylthiol, $C_5$-$C_{24}$-arylthiol, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_5$-$C_{24}$-aryl radicals, where the latter radicals may in turn be substituted by one or more substituents selected from the group consisting of halogen, preferably fluorine, $C_1$-$C_5$-alkyl, $C_1$-$C_5$-alkoxy and phenyl.

In a preferred embodiment, X and $X^1$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, X and $X^1$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (B), the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_5$-$C_{24}$-aryl, $C_1$-$C_{20}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylamino, $C_1$-$C_{20}$-alkylthio, $C_5$-$C_{24}$-arylthio, $C_1$-$C_{20}$-alkylsulphonyl or $C_1$-$C_{20}$-alkylsulphinyl radical, each of which may optionally be substituted by one or more alkyl, halogen, alkoxy, aryl or heteroaryl radicals.

$R^1$ is preferably a $C_3$-$C_{20}$-cycloalkyl radical, a $C_6$-$C_{24}$-aryl radical or a straight-chain or branched $C_1$-$C_{30}$-alkyl radical, where the latter may be interrupted by one or more double or triple bonds or one or more heteroatoms, preferably oxygen or nitrogen. $R^1$ is particularly preferably a straight-chain or branched $C_1$-$C_{12}$-alkyl radical.

The $C_3$-$C_{20}$-cycloalkyl radical encompasses, for example, cyclopropyl, cyclobutyl, cyclopentyl, cyclohexyl, cycloheptyl and cyclooctyl.

The $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

The $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made of, for example, phenyl, biphenyl, naphthyl, phenanthrenyl or anthracenyl.

In the general formula (B), the radicals $R^2$, $R^3$, $R^4$ and $R^5$ are identical or different and can be hydrogen or organic or inorganic radicals.

In a suitable embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radicals, each of which may optionally be substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_5$-$C_{24}$-aryl, $C_1$-$C_{20}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylamino, $C_1$-$C_{20}$-alkylthio, $C_5$-$C_{24}$-arylthio, $C_1$-$C_{20}$-alkylsulphonyl or $C_1$-$C_{20}$-alkylsulphinyl radicals, each of which may optionally be substituted by one or more $C_1$-$C_{30}$-alkyl, $C_1$-$C_{20}$-alkoxy, halogen, $C_5$-$C_{24}$-aryl or heteroaryl radicals.

In a particularly useful embodiment, $R^2$, $R^3$, $R^4$, $R^5$ are identical or different and are each nitro, straight-chain or branched $C_1$-$C_{30}$-alkyl, $C_5$-$C_{20}$-cycloalkyl, straight-chain or branched $C_1$-$C_{20}$-alkoxy radicals or $C_5$-$C_{24}$-aryl radicals, preferably phenyl or naphthyl. The $C_1$-$C_{30}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can be bridged via aliphatic or aromatic structures. For example, $R^3$ and $R^4$ together with the carbon atoms to which they are bound in the phenyl ring of the formula (B) can form a fused-on phenyl ring so that the overall result is a naphthyl structure.

In the general formula (B), $R^6$ is hydrogen or an alkyl, alkenyl, alkynyl or aryl radical. $R^6$ is preferably hydrogen or a $C_1$-$C_{30}$-alkyl, $C_2$-$C_{20}$-alkenyl, $C_2$-$C_{20}$-alkynyl or $C_5$-$C_{24}$-aryl radical. $R^6$ is particularly preferably hydrogen.

The process of the invention can also be carried out using catalysts of the general formula (B1),

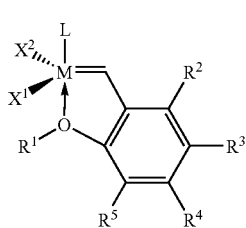
(B1)

where
M, L, $X^1$, $X^2$, $R^1$, $R^2$, $R^3$, $R^4$ and $R^5$ can have the general, preferred and particularly preferred meanings given for the general formula (B).

These catalysts are known in principle from, for example, US 2002/0107138 A1 (Hoveyda et al.) and can be obtained by the preparative methods indicated there.

In the process of the invention, preference is given to using catalysts of the general formula (B1) in which
M is ruthenium,
$X^1$ and $X^2$ are both halogen, in particular both chlorine,
$R^1$ is a straight-chain or branched $C_1$-$C_{12}$-alkyl radical,
$R^2$, $R^3$, $R^4$, $R^5$ have the general and preferred meanings given for the general formula (B) and
L has the general and preferred meanings given for the general formula (B).

Particular preference is given, in the process of the invention, to using catalysts of the general formula (B1) in which
M is ruthenium,
$X^1$ and $X^2$ are both chlorine,
$R^1$ is an isopropyl radical,
$R^2$, $R^3$, $R^4$, $R^5$ are all hydrogen and
L is a substituted or unsubstituted imidazolidine radical of the formula (IIa) or (IIb),

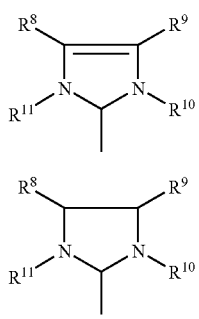
(IIa)

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylthio, $C_5$-$C_{24}$-arylthio, $C_1$-$C_{20}$-alkylsulphonyl, $C_1$-$C_{20}$-alkylsulphonate, $C_5$-$C_{24}$-arylsulphonate or $C_1$-$C_{20}$-alkylsulphinyl.

The catalyst of the general structural formula (B1) used in the process of the invention is very particularly preferably a catalyst of the formula (VI), where Mes is in each case a 2,4,6-trimethylphenyl radical,

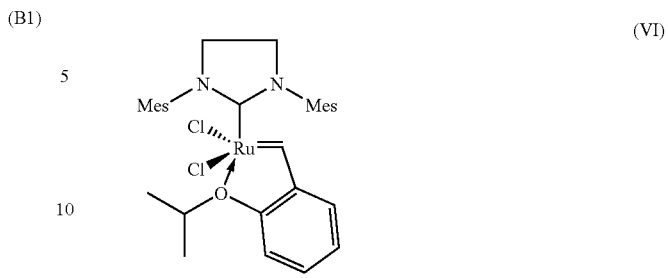
(VI)

This catalyst is also referred to as "Hoveyda catalyst".

Furthermore, catalysts of the general structural formula (B1) used in the process of the invention can be catalysts of the following formulae (VII), (VIII), (IX), (X), (XI), (XII), and (XIII), where Mes is in each case a 2,4,6-trimethylphenyl radical.

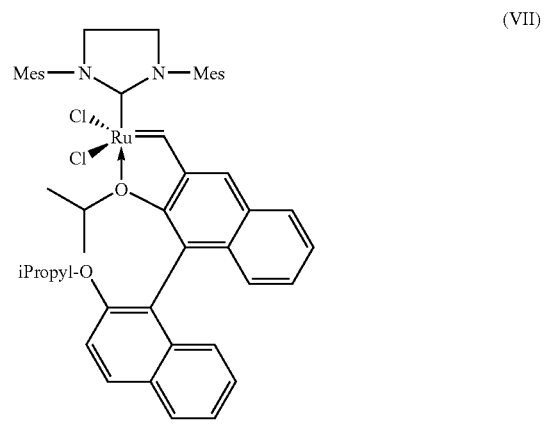
(VII)

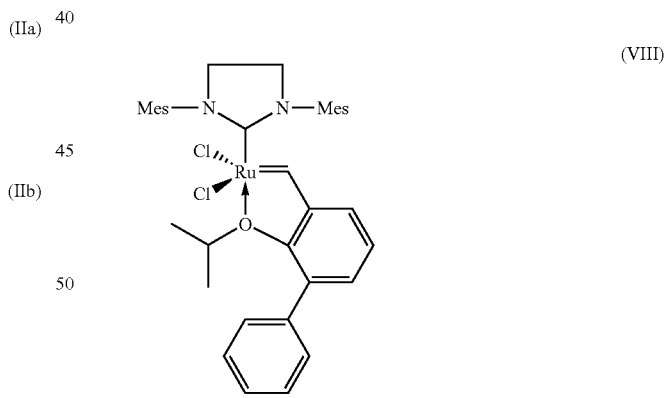
(VIII)

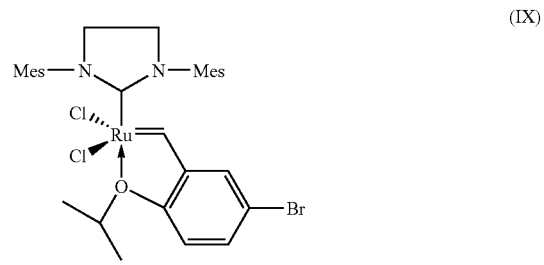
(IX)

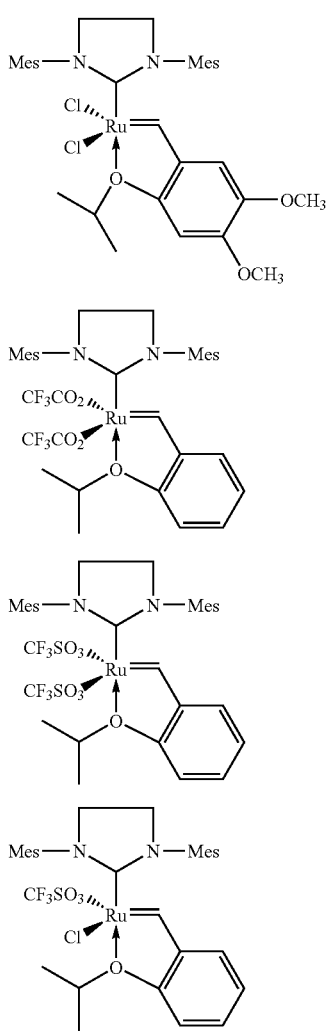

(X)

(XI)

(XII)

(XIII)

Furthermore, Catalysts of the General Formula (B2),

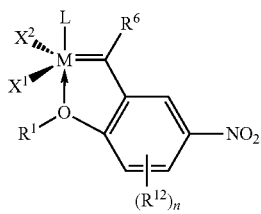

(B2)

where

M, L, $X^1$, $X^2$, $R^1$ and $R^6$ have the general and preferred meanings give for the formula (B), the radicals $R^{12}$ are identical or different and have the general and preferred meanings, with the exception of hydrogen, given for the radicals $R^2$, $R^3$, $R^4$ and $R^5$ in the formula (B) and n is 0, 1, 2 or 3, can also be used in the process of the invention.

These catalysts are known in principle from, for example, WO-A-2004/035596 (Grela) and can be obtained by the preparative methods indicated there.

Particular preference is given, in the process of the invention, to using catalysts of the general formula (B2) in which M is ruthenium, $X^1$ and $X^2$ are both halogen, in particular both chlorine, $R^1$ is a straight-chain or branched $C_1$-$C_{12}$-alkyl radical, $R^{12}$ is as defined for the general formula (B), n is 0, 1, 2 or 3, $R^6$ is hydrogen and L is as defined for the general formula (B).

Very particular preference is given, in the process of the invention, to using catalysts of the general formula (B2) in which M is ruthenium, $X^1$ and $X^2$ are both chlorine, $R^1$ is an isopropyl radical, n is 0 and L is a substituted or unsubstituted imidazolidine radical of the formula (IIa) or (IIb),

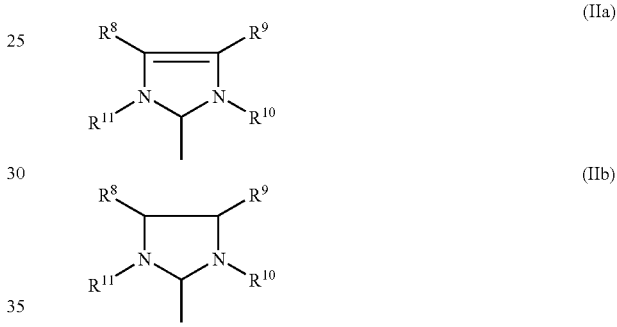

where $R^8$, $R^9$, $R^{10}$, $R^{11}$ are identical or different and are each hydrogen, straight-chain or branched, cyclic or acyclic $C_1$-$C_{30}$-allyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylthio, $C_5$-$C_{24}$-arylthio, $C_1$-$C_{20}$-alkylsulphonyl, $C_1$-$C_{20}$-alkylsulphonate, $C_5$-$C_{24}$-arylsulphonate or $C_1$-$C_{20}$-alkylsulphinyl.

A particularly preferred catalyst which comes under the general formula (B2) has the structure (XIV)

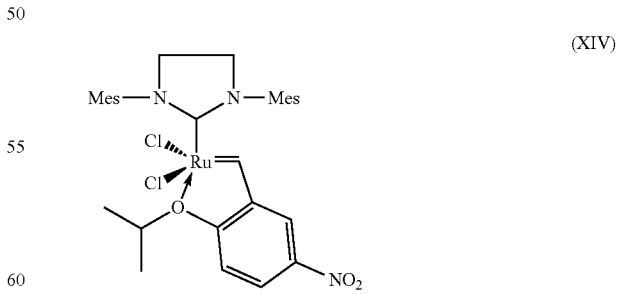

(XIV)

and is also referred to as "Grela catalyst" in the literature.

A further catalyst which is suitable for the process of the invention and comes under the general formula (B2) has the following structure (XV), where Mes is in each case a 2,4,6-trimethylphenyl radical,

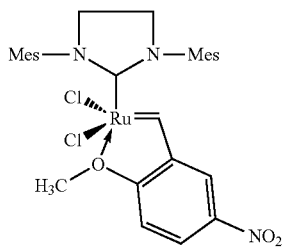

(XV)

In an alternative embodiment, the process of the invention is carried out using dendritic catalysts of the general formula (B3),

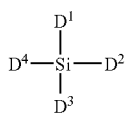

(B3)

where $D^1$, $D^2$, $D^3$ and $D^4$ each have a structure of the general formula (XVI) which is bound via the methylene group to the silicon of the formula (B3)

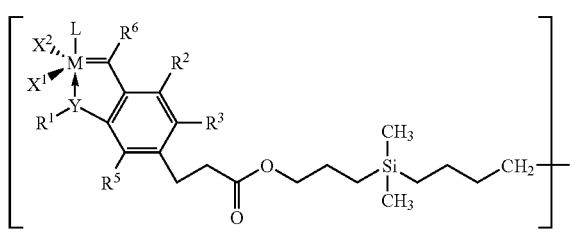

(XVI)

where

M, L, $X^1$, $X^2$, $R^1$, $R^2$, $R^3$, $R^5$ and $R^6$ are as defined for the general formula (B) and can also have the abovementioned preferred meanings.

Such catalysts of the general formula (B3) are known from US 2002/0107138 A1 and can be prepared by the methods described there.

In a further alternative embodiment, it is possible to use a catalyst of the formula (B4),

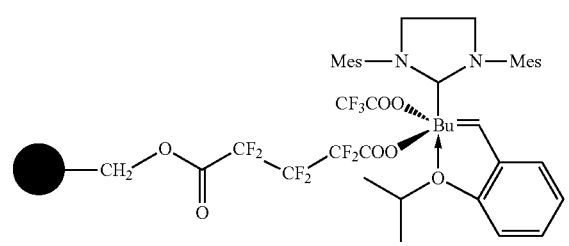

(B4)

where the symbol

● is a support.

The support is preferably a poly(styrene-divinylbenzene) copolymer (PS-DVB).

These catalysts of the formula (B4) are known in principle from Chem. Eur. J. 2004 10, 777-784 and can be obtained by the preparative methods described there.

All the abovementioned catalysts of the type (B) can either be used as such in the reaction mixture of the NBR metathesis or else can be applied to and immobilized on a solid support. As solid phases or supports, it is possible to use materials which firstly are inert towards the reaction mixture of the metathesis and secondly do not adversely affect the activity of the catalyst. It is possible to use, for example, metals, glass, polymers, ceramics, organic polymer spheres or inorganic sol gels for immobilizing the catalyst.

The process of the invention can also be carried out using catalysts of the general formula (C),

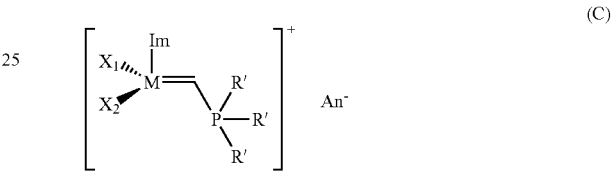

(C)

where

M is ruthenium or osmium, $X^1$ and $X^2$ can be identical or different and are anionic ligands, the radicals R' are identical or different and are organic radicals, Im is a substituted or unsubstituted imidazolidine radical and An is an anion.

These catalysts are known in principle (see, for example, Angew. Chem. Int. Ed. 2004, 43, 6161-6165).

$X^1$ and $X^2$ in the general formula (C) can have the same general, preferred and particularly preferred meanings as in formula (B).

The imidazolidine radical (Im) usually has a structure of the general formula (IIa) or (IIb), which have been mentioned above for the catalyst type of the formulae (A) and (B) and can have all the structures mentioned there as preferred, in particular those of the formulae (Va)-(Vf).

The radicals R' in the general formula (C) are identical or different and are each a straight-chain or branched $C_1$-$C_{30}$-alkyl, $C_5$-$C_{30}$-cycloalkyl or aryl radical, where the $C_1$-$C_{30}$-alkyl radicals may be interrupted by one or more double or triple bonds or one or more heteroatoms, preferably oxygen or nitrogen.

Aryl is an aromatic radical having from 5 to 24 skeletal carbon atoms. As preferred monocyclic, bicyclic or tricyclic carbocyclic aromatic radicals having from 6 to 10 skeletal carbon atoms, mention may be made of, for example, phenyl, biphenyl, naphthyl, phenanthrenyl or anthracenyl.

Preference is given to the radicals R' in the general formula (C) being identical and each being phenyl, cyclohexyl, cyclopentyl, isopropyl, o-tolyl, o-xylyl or mesityl.

Furthermore, the process of the invention can be carried out using catalysts of the general formula (D),

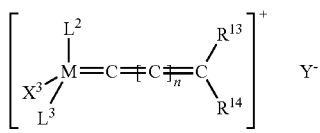

(D)

where

M is ruthenium or osmium, $R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $X^3$ is an anionic ligand, $L^2$ is an uncharged n-bonded ligand which can be either monocyclic or polycyclic, $L^3$ is a ligand from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines, stibines, ethers, amines, amides, imines, sulphoxides, thioethers and pyridines, $Y^-$ is a noncoordinating anion and n is 0, 1, 2, 3, 4 or 5.

Furthermore, the process of the invention can be carried out using catalysts of the general formula (E),

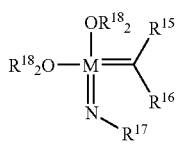

(E)

where $M^2$ is molybdenum or tungsten, $R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $R^{17}$ and $R^{18}$ are identical or different and are each a substituted or halogen-substituted $C_1$-$C_{20}$-alkyl, $C_5$-$C_{24}$-aryl, $C_6$-$C_{30}$-aralkyl radical or a silicon-containing analogue thereof.

Furthermore, the process of the invention can be carried out using catalysts of the general formula (F),

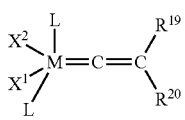

(F)

where

M is ruthenium or osmium, $X^1$ and $X^2$ are identical or different and are anionic ligands which may have any of the meanings of $X^1$ and $X^2$ in the general formulae (A) and (B), L are identical or different ligands which can have any of the general and preferred meanings of L in the general formulae (A) and (B), $R^{19}$ and $R^{20}$ are identical or different and are each hydrogen or substituted or unsubstituted alkyl.

The amount of metathesis catalyst based on the nitrile rubber used depends on the nature and also the catalytic activity of the specific catalyst. The amount of catalyst used is usually from 1 to 1000 ppm of noble metal, preferably from 2 to 500 ppm, in particular from 5 to 250 ppm, based on the nitrile rubber used.

The phosphanes of the general formula (IA) and the diphosphanes of the general formula (IB) are added either in solid or in dissolved form either separately or together with the solution of the catalyst to the solution of the nitrile rubber.

The NBR metathesis can be carried out in the absence or else in the presence of a coolefin. This is preferably a straight-chain or branched $C_2$-$C_{16}$-olefin. Suitable coolefins are, for example, ethylene, propylene, isobutene, styrene, 1-hexene and 1-octene. Preference is given to using 1-hexene or 1-octene. If the coolefin is liquid (for example 1-hexene), the amount of coolefin is preferably in the range 0.2-20% by weight based on the NBR used. If the coolefin is a gas, for example ethylene, the amount of the coolefin is selected so that a pressure in the range $1 \times 10^5$ Pa-$1 \times 10^7$ Pa, preferably a pressure in the range from $5.2 \times 10^5$ Pa to $4 \times 10^6$ Pa, is established in the reaction vessel at room temperature.

The metathesis reaction can be carried out in a suitable solvent which does not deactivate the catalyst used and also does not adversely affect the reaction in any other way. Preferred solvents include, but are not restricted to, dichloromethane, benzene, toluene, methyl ethyl ketone, acetone, tetrahydrofuran, tetrahydropyran, dioxane and cyclohexane. The particularly preferred solvent is chlorobenzene. In some cases when the coolefin itself can function as solvent, e.g. in the case of 1-hexene, the addition of a further additional solvent can be dispensed with.

The concentration of the nitrile rubber in the reaction mixture of the metathesis is not critical, but it naturally has to be ensured that the reaction is not adversely affected by an excessively high viscosity of the reaction mixture and the mixing problems associated therewith. The concentration of the NBR in the reaction mixture is preferably in the range from 1 to 20% by weight, particularly preferably in the range from 5 to 15% by weight, based on the total reaction mixture.

The metathetic degradation is usually carried out at a temperature in the range from 10° C. to 150° C., preferably at a temperature in the range from 20 to 100° C.

The reaction time depends on a number of factors, for example on the type of the NBR, the type of catalyst, the catalyst concentration used and the reaction temperature. The reaction is typically complete within three hours under normal conditions. The progress of the metathesis can be monitored by standard analytical methods, e.g. by GPC measurements or by determination of the viscosity.

Nitrile Rubbers:

As nitrile rubbers ("NBR"), it is possible to use copolymers or terpolymers comprising repeating units of at least one conjugated diene, at least one α,β-unsaturated nitrile and, if desired, one or more further copolymerizable monomers in the metathesis reaction.

The conjugated diene can be of any nature. Preference is given to using ($C_4$-$C_6$)-conjugated dienes. Particular preference is given to 1,3-butadiene, isoprene, 2,3-dimethylbutadiene, piperylene or mixtures thereof. 1,3-Butadiene and isoprene or mixtures thereof are especially preferred. Very particular preference is given to 1,3-butadiene.

As α,β-unsaturated nitrile, it is possible to use any known α,β-unsaturated nitrile, with preference being given to ($C_3$-$C_5$)-α,β-unsaturated nitrites such as acrylonitrile, methacrylonitrile, ethacrylonitrile or mixtures thereof. Particular preference is given to acrylonitrile.

A particularly preferred nitrile rubber is a copolymer of acrylonitrile and 1,3-butadiene.

Apart from the conjugated diene and the α,β-unsaturated nitrile, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl(meth)acrylate, ethoxyethyl(meth)acrylate and methoxyethyl(meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymer to be used can vary within wide ranges. The proportion of the conjugated diene or the sum of the conjugated dienes is usually in the range from 40 to 90% by weight, preferably in the range from 60 to 85% by weight, based on the total polymer. The proportion of the α,β-unsaturated nitrile or the sum of the α,β-unsaturated nitrites is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, appropriate proportions of the conjugated diene or dienes and/or the α,β-unsaturated nitrile or nitrites are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the series sold under the trade names Perbunan® and Krynac® by Lanxess Deutschland GmbH.

The nitrile rubbers used for the metathesis have a Mooney viscosity (ML 1+4 at 100° C.) in the range from 30 to 70, preferably from 30 to 50. This corresponds to a weight average molecular weight $M_w$ in the range from 200 000 to 500 000, preferably in the range from 200 000 to 400 000. Furthermore, the nitrile rubbers used have a polydispersity $PDI=M_w/M_n$, where $M_w$ is the weight average molecular weight and $M_w$ is the number average molecular weight, in the range from 2.0 to 6.0 and preferably in the range from 2.0 to 4.0.

The determination of the Mooney viscosity is carried out in accordance with ASTM standard D 1646.

Nitrile Rubbers Degraded by Metathesis:

The nitrile rubbers obtained by the metathesis process of the invention have a Mooney viscosity (ML 1+4 at 100° C.) in the range from 5 to 30, preferably from 5 to 20. This corresponds to a weight average molecular weight $M_w$ in the range from 10 000 to 200 000, preferably in the range from 10 000 to 150 000. Furthermore, the nitrile rubbers obtained have a polydispersity $PDI=M_w/M_n$, where $M_n$ is the number average molecular weight, in the range from 1.5 to 4.0, preferably in the range from 1.7 to 3.

Hydrogenation:

The metathetic degradation in the presence of the catalyst and also phosphane or diphosphane can be followed by hydrogenation of the degraded nitrile rubbers obtained. This hydrogenation can be carried out in the manner known to those skilled in the art.

It is possible to carry out the hydrogenation using homogeneous or heterogeneous hydrogenation catalysts. It is also possible to carry out the hydrogenation in situ, i.e. in the same reaction vessel in which the metathetic degradation has previously been carried out and without the need to isolate the degraded nitrile rubber. The hydrogenation catalyst is for this purpose simply added to the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (see, for example, U.S. Pat. No. 3,700,637, DE-A-25 39 132, EP-A-0 134 023, DE-EA-35 41 689, DE-EA-35 40 918, EP-A-0 298 386, DE-EA-35 29 252, DE-EA-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can, for example, be achieved in the presence of a rhodium- or ruthenium-containing catalyst. It is possible to use, for example, a catalyst of the general formula

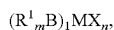

where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis (triphenylphosphine)rhodium hydride of the formula $(C_6H_5)_3P)_4RhH$ and the corresponding compounds in which the triphenylphosphine has been entirely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable.

It is usually useful to use the catalyst together with a cocatalyst which is a ligand of the formula $R^1_m Bt$, where $R^1$, m and B are as defined above for the catalyst. m is preferably 3, B is preferably phosphorus and the radicals $R^1$ can be identical or different. Preference is given to cocatalysts having trialkyl, tricycloalkyl, triaryl, triaralkyl, diaryl-monoalkyl, diaryl-monocycloalkyl, dialkyl-monoaryl, dialkyl-monocycloalkyl, dicycloalkyl-monoaryl or dicycloalkyl-monoaryl radicals.

Examples of cocatalysts may be found, for example, in U.S. Pat. No. 4,631,315. A preferred cocatalyst is triphenylphosphine. The cocatalyst is preferably used in amounts in the range 0.3-5% by weight, preferably in the range 0.5-4% by weight, based on the weight of the nitrile rubber to be hydrogenated. Furthermore, the weight ratio of the rhodium-containing catalyst to the cocatalyst is preferably in the range from 1:3 to 1:55, preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 and very particularly preferably from 1 to 5 parts by weight, in particular more than 2 but less than 5 parts by weight, of cocatalyst.

The practical procedure for carrying out this hydrogenation is adequately known to those skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of at least 50%, preferably 70-100%, particularly preferably 80-100%, of the double bonds present in the starting nitrile rubber.

When heterogeneous catalysts are used, these are usually supported catalysts based on palladium which are supported, for example, on carbon, silica, calcium carbonate or barium sulphate.

After the hydrogenation is complete, a hydrogenated nitrile rubber having a Mooney viscosity (ML 1+4 at 100° C.), measured in accordance with ASTM standard D 1646, in the range from 10 to 50, preferably from 10 to 30, is obtained. This corresponds to a weight average molecular weight $M_w$ in the range from 2000 to 400 000 g/mol, preferably in the range from 20 000 to 200 000. Furthermore, the hydrogenated nitrile rubbers obtained have a polydispersity $PDI = M_w/M_n$, where $M_w$ is the weight average molecular weight and $M_n$ is the number average molecular weight, in the range from 1 to 5 and preferably in the range from 1.5 to 3.

The activity of the metathesis catalysts can be increased significantly by the use according to the invention of the phosphanes of the general formula (IA) or diphosphanes of the general formula (IB). As a result of the additions of phosphane/diphosphane, a significantly higher reaction rate and, at comparable reaction times, lower molar masses (Mw and Mn) can be obtained. In addition, the degraded nitrile rubbers are gel-free.

EXAMPLES

The following examples were carried out using the following catalysts:

"Grubbs II Catalyst":

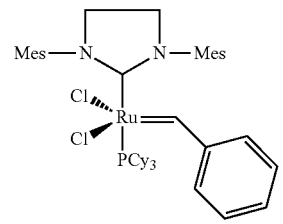

The Grubbs II catalyst was procured from Materia (Pasadena/Calif.).

"Buchmeiser Nuyken Catalyst":

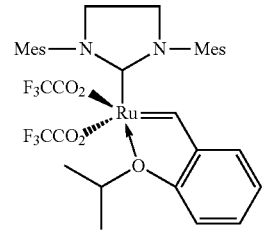

The Buchmeiser-Nuyken catalyst (molecular weight: 781.75 g/mol) was prepared by the synthesis published in Adv. Synth. Catal. 2003, 345, 996.

As phosphane additives, use was made of tricyclohexylphosphane (molecular weight=280.23 g/mol, referred to as $PCy_3$ for short) and triphenylphosphane (molecular weight: 262.09; $PPh_3$ for short); tricyclohexylphosphane and triphenylphosphane were procured from Aldrich.

The metathesis reactions were carried out using the nitrile rubber Perbunan® NT 3435 from Lanxess Deutschland GmbH as substrate.

This nitrile rubber had the following characteristic properties:

| | |
|---|---|
| Acrylonitrile content: | 35% by weight |
| Mooney value (ML 1 + 4 at 100° C.): | 34 Mooney units |
| Residual moisture content: | 1.8% by weight |
| Mw: | 240 000 g/mol |
| Mn: | 100 000 g/mol |
| PDI ($M_w/M_n$): | 2.4 |

In the following, this nitrile rubber will be referred to as NBR for short.

The following experiments were carried out:

| Experiment No. | Catalyst | NBR grade | Phosphane | Molar ratio (catalyst:phosphane) |
|---|---|---|---|---|
| 1.0. (comparison) | Grubbs II | NT 3435 | — | — |
| 1.1. | Grubbs II | NT 3435 | tricyclohexylphosphane | 1:0.12 |
| 1.2. | Grubbs II | NT 3435 | tricyclohexylphosphane | 1:1.2 |
| (comparison) | | | | |
| 1.3. (comparison) | Grubbs II | NT 3435 | tricyclohexylphosphane | 1:10 |
| 2.1. | Grubbs II | NT 3435 | triphenylphosphane | 1:0.12 |
| 2.2. (comparison) | Grubbs II | NT 3435 | triphenylphosphane | 1:10 |
| 2.3. (comparison) | Grubbs II | NT 3435 | triphenylphosphane | 1:1000 |
| 3.0. (comparison) | Buchmeiser-Nuyken | NT 3435 | — | — |
| 3.1. | Buchmeiser-Nuyken | NT 3435 | tricyclohexylphosphane | 1:0.12 |

Chlorobenzene (hereinafter referred to as "MCB"/from Aldrich) which was distilled and made inert by passing argon through it at room temperature before use was used as solvent for the metathetic degradation.

In the experiments, a total of 293.3 g of MCB was in each case used per 40 g of NBR (12% strength solutions based on NBR).

For the examples according to the invention with the phosphane additions, 40 g of NBR were dissolved in 268.30 g of MCB over a period of 10 hours at room temperature. In the comparative experiments without phosphane additions, 273.3 g of MCB were used per 40 g of NBR. In the examples according to the invention, firstly the amounts of phosphane indicated in the tables (in each case dissolved in 5 g of MCB) and then in each case 0.8 g (2 phr) of 1-hexene were added. Before the addition of catalyst, the reaction mixture was stirred at room temperature for 30 minutes. The metathesis catalysts were added as a solution in MCB immediately after the preparation of the catalyst solutions, with the amounts of catalyst indicated in the tables being in each case dissolved in 20 g of MCB at room temperature under argon. All reactions were carried out at room temperature.

After the reaction times indicated in the following tables, about 3 ml of the reaction solutions were taken in each case and immediately admixed with about 1 ml of ethyl vinyl ether to stop the reaction and subsequently diluted with 5 ml of DMAc (N,N-dimethylacetamide) from Aldrich. 2 ml of these solutions were in each case placed in a GPC bottle and diluted to 3 ml with DMAc. Before carrying out the GPC analysis, the solutions were in each case filtered by means of a 0.2 μm Teflon syringe filter (Chromafil PTFE 0.2 μm; from Machery-Nagel). The GPC analysis was subsequently carried out using an instrument from Waters (mod. 510). A combination of 4 columns from Polymer Laboratories was used for the analysis: 1) PLgel 5 μm Mixed-C, 300×7.5 mm, 2) PLgel 5 μm Mixed-C, 300×7.5 mm, 3) PLgel 3 μm Mixed-E, 300×7.5 mm, and 4) PLgel 3 μm Mixed-E, 300×7.5 mm.

The GPC columns were calibrated using linear poly(methyl methacrylate) from Polymer Standards Services. An RI detector from Waters (Waters 410) was used as detector. The analyses were carried out using a flow rate of 0.5 ml/min using DMAc as eluent. The evaluation of the GPC curves was carried out using software from Millenium.

The following characteristic properties were determined by means of GPC analysis both for the original NBR rubber (before degradation) and for the degraded nitrile rubbers:

$M_w$ [kg/mol]: weight average molar mass $M_n$ [kg/mol]: number average molar mass PDI: width of the molar mass distribution ($M_w/M_n$)

Trial 1.0
Metathetic degradation using Grubbs II catalyst without addition of phosphane (comparative experiment)

| Trial 1.0. | Addition Type | Amount [g] | Solvent Type | Amount [g] | Time [min.] | $M_w$ [kg/mol] | $M_n$ [kg/mol] | PDI |
|---|---|---|---|---|---|---|---|---|
| | | | | | 0 | 240 | 100 | 2.4 |
| | | | | | 30 | 185 | 84 | 2.13 |
| | | | | | 60 | 165 | 79 | 2.11 |
| | | | | | 185 | 77 | 38 | 2.03 |
| | | | | | 425 | 60 | 35 | 1.71 |
| | — | — | — | — | 1300 | 53 | 29 | 1.82 |

Trial 1.1
Metathetic degradation using a molar ratio (Grubbs II catalyst:$PCy_3$) = 1:0.12 (according to the invention)

| Trial 1.1. | Addition Type | Amount [g] | Solvent Type | Amount [g] | Time [min.] | $M_w$ [kg/mol] | $M_n$ [kg/mol] | PDI |
|---|---|---|---|---|---|---|---|---|
| | | | | | 0 | 240 | 100 | 2.4 |
| | | | | | 30 | 97 | 49 | 1.96 |
| | | | | | 60 | 71 | 39 | 1.84 |
| | | | | | 185 | 47 | 28 | 1.66 |
| | | | | | 425 | 41 | 26 | 1.61 |
| | $PCy_3$ | 0.0008 | MCB | 4 | 1300 | — | — | |

In Example 1.1, according to the invention with addition of tricyclohexylphosphane, a higher reaction rate and, at comparable reaction times, lower molar masses ($M_w$ and $M_n$) were obtained compared to the phosphane-free Comparative Experiment 1.0. In addition, the degraded NBR samples were gel-free.

Trial 1.2
Metathetic degradation using a molar ratio (Grubbs II catalyst:$PCy_3$) = 1:1.2 (comparative experiment)

| Trial 1.2. | Addition | | | | Time [min.] | Mw [kg/ mol] | Mn [kg/ mol] | PDI |
|---|---|---|---|---|---|---|---|---|
| | Type | Amount [g] | Solvent Type | Amount [g] | | | | |
| | | | | | 0 | 240 | 100 | 2.4 |
| | | | | | 30 | 180 | 87 | 2.0 |
| | | | | | 60 | 149 | 79 | 1.9 |
| | | | | | 185 | 99 | 63 | 1.6 |
| | | | | | 425 | 57 | 34 | 1.7 |
| | $PCy_3$ | 0.0008 | MCB | 4 | 1300 | 51 | 30 | 1.7 |

In trial 1.2, with addition of 1.2 equivalents of tricyclohexylphosphane per equivalent of catalyst, a virtually identical reaction rate and comparable molar masses ($M_w$ and $M_n$) compared to the phosphane-free Comparative Experiment (1.0.) were found after long reaction times.

Trial 1.3:
Metathetic degradation using a molar ratio (Grubbs II catalyst:$PCy_3$) = 1:10 (comparative experiment)

| Trial 1.3. | Addition | | | | Time [min.] | Mw [kg/ mol] | Mn [kg/ mol] | PDI |
|---|---|---|---|---|---|---|---|---|
| | Type | Amount [g] | Solvent Type | Amount [g] | | | | |
| | | | | | 0 | 240 | 100 | 2.4 |
| | | | | | 30 | 236 | 100 | 2.4 |
| | | | | | 60 | 206 | 85 | 2.4 |
| | | | | | 185 | 159 | 77 | 2.1 |
| | | | | | 425 | 130 | 68 | 1.9 |
| | $PCy_3$ | 0.061 | MCB | 4 | 1300 | — | — | — |

In Comparative Experiment 1.3, with an addition of 10 equivalents of tricyclohexylphosphane per equivalent of catalyst, it was found that the metathetic degradation was slower and the molar masses ($M_w$ and $M_n$) after long reaction times were even higher than in the reference experiment without addition of phosphane (1.0.).

Trial 2.1:
Metathetic degradation using a molar ratio (Grubbs II catalyst:$PPh_3$) = 1:0.12 (according to the invention)

| Trial 2.1. | Addition | | | | Time [min.] | Mw [kg/ mol] | Mn [kg/ mol] | PDI |
|---|---|---|---|---|---|---|---|---|
| | Type | Amount [g] | Solvent Type | Amount [g] | | | | |
| | | | | | 0 | 240 | 100 | 2.4 |
| | | | | | 30 | 111 | 51 | 2.17 |
| | | | | | 60 | 76 | 40 | 1.88 |
| | | | | | 185 | 57 | 34 | 1.87 |
| | | | | | 425 | 55 | 30 | 1.69 |
| | $PPh_3$ | 0.00075 | MCB | 4 | 1300 | — | — | — |

Experiment 2.1, demonstrates that the metathetic degradation is accelerated compared to the Comparative Experiment without addition of phosphane (Trial 1.0.) and the molar masses ($M_w$ and $M_n$) after long reaction times are lower as a result of addition of tripenylphosphane in a molar ratio of Grubbs II catalyst:$PPh_3$=1:0.12. In addition, the degraded NBR samples were gel-free.

Trial 2.2:
Metathetic degradation using a molar ratio (Grubbs II catalyst:$PPh_3$) = 1:10 (comparison)

| Trial 2.2. | Addition | | | | Time [min.] | Mw [kg/ mol] | Mn [kg/ mol] | PDI |
|---|---|---|---|---|---|---|---|---|
| | Type | Amount [g] | Solvent Type | Amount [g] | | | | |
| | | | | | 0 | 240 | 100 | 2.4 |
| | | | | | 30 | 208 | 97 | 2.1 |
| | | | | | 60 | 169 | 81 | 2.1 |
| | | | | | 185 | 140 | 71 | 2.0 |
| | | | | | 425 | 107 | 56 | 1.9 |
| | $PPh_3$ | 0.062 | MCB | 4 | 1300 | — | — | — |

In Comparative Experiment 2.2, with an addition of 10 equivalents of triphenylphosphane per equivalent of catalyst, it was found that the metathetic degradation is slower and the molar masses ($M_w$ and $M_n$) after long reaction times are even higher than in the Comparative Experiment without addition of phosphane (Trial 1.0.).

Trial 2.3
Metathetic degradation using a molar ratio (Grubbs II catalyst:$PPh_3$) = 1:1000 (comparison)

| Trial 2.3. | Addition | | | | Time [min.] | Mw [kg/ mol] | Mn [kg/ mol] | PDI |
|---|---|---|---|---|---|---|---|---|
| | Type | Amount [g] | Solvent Type | Amount [g] | | | | |
| | | | | | 0 | 240 | 100 | 2.4 |
| | | | | | 30 | 224 | 100 | 2.2 |
| | | | | | 60 | — | — | — |
| | | | | | 185 | 198 | 98 | 2.1 |
| | | | | | 425 | 178 | 75 | 2.4 |
| | $PPh_3$ | 6.20 | MCB | 8 | 1300 | — | — | — |

In the Comparative Experiment 2.3, with an addition of triphenylphosphane (molar ratio of phosphane:catalyst=1000:1) it was found that the metathetic degradation was slower and the moral masses ($M_w$ and $M_n$) after long reaction times were higher than in the reference experiment without addition of phosphane (1.0).

In the Trials 3.0 and 3.1 below, use was made in each case of 40 g of NBR, 36.8 mg of the Buchmeiser/Nuyken catalyst, corresponding to 0.092 parts by weight per 100 parts by weight of NBR, and 0.8 g of 1-hexene, corresponding to 2.0 parts by weight per 100 parts by weight of NBR.

Trial 3.0
Metathetic degradation using Buchmeiser-Nuyken catalyst
without addition of phosphane (comparative experiment)

| Trial 3.0. | Addition | | | | Time [min.] | Mw [kg/mol] | Mn [kg/mol] | PDI |
|---|---|---|---|---|---|---|---|---|
| | Type | Amount [g] | Solvent Type | Amount [g] | | | | |
| | | | | | 0 | 240 | 100 | 2.4 |
| | | | | | 30 | 221 | 79 | 2.8 |
| | | | | | 60 | 219 | 78 | 2.8 |
| | | | | | 185 | — | — | — |
| | | | | | 425 | 130 | 67 | 1.9 |
| — | — | — | — | — | 1300 | — | — | — |

Trial 3.1
Metathetic degradation using a molar ratio (Buchmeiser-Nuyken
catalyst:PCy$_3$) = 1:0.12 (according to the invention)

| Trial 3.1. | Addition | | | | Time [min.] | Mw [kg/mol] | Mn [kg/mol] | PDI |
|---|---|---|---|---|---|---|---|---|
| | Type | Amount [g] | Solvent Type | Amount [g] | | | | |
| | | | | | 0 | 240 | 100 | 2.4 |
| | | | | | 30 | 129 | 56 | 2.3 |
| | | | | | 60 | — | — | — |
| | | | | | 185 | 117 | 58 | 2.0 |
| | | | | | 425 | 111 | 57 | 1.9 |
| | PCy$_3$ | 0.0016 | MCB | 4 | 1300 | — | — | — |

In Experiment 3.1, according to the invention, it was shown that the rate of the metathetic degradation using the Buchmeiser/Nuyken catalyst was increased as a result of the addition of tricyclohexylphosphane (molar ratio of catalyst:phosphane=1:0.12) and the molar masses ($M_w$ and $M_n$) after long reaction times are lower than in the reference experiment without addition of phosphane (3.0). In addition, the degraded NBR samples were gel-free.

What is claimed is:

1. A process comprising the metathetic degradation of nitrile rubber in the presence of a catalyst and a phosphane or a diphosphane, wherein from 0.01 to 1 equivalent of the phosphane or diphosphane is used per 1 equivalent of catalyst.

2. The process according to claim 1, wherein the phosphane or diphosphane is used in an amount in the range from 0.05 to 0.5 equivalent, based on 1 equivalent of catalyst.

3. The process according to claim 1 or 2, wherein a compound of the general formula (IA),

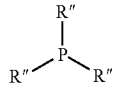

(IA)

wherein
all the radicals R" are identical or different and are each alkyl, alkenyl, alkadienyl, alkoxy, aryl, heteroaryl, cycloalkyl, cycloalkenyl, cycloalkadienyl, halogen or trimethylsilyl,
is used as phosphane.

4. The process according to claim 1 or 2, wherein a compound of the general formula (IB),

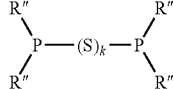

(IB)

wherein
all the radicals R" are identical or different and are each alkyl, alkenyl, alkadienyl, alkoxy, aryl, heteroaryl, cycloalkyl, cycloalkenyl, cycloalkadienyl, halogen or trimethylsilyl,
k is 0 or 1 and
S is a straight-chain or branched alkanediyl, alkenediyl or alkynediyl group,
is used as diphosphane.

5. The process according to claim 3, wherein trialkylphosphanes, tricycloalkylphosphanes, triarylphosphanes, trialkarylphosphanes, triaralkylphosphanes, diarylmonoalkylphosphanes, diarylmonocycloalkylphosphanes, dialkylmonoarylphosphanes, dialkylmono-cycloalkylphosphanes or dicycloalkylmonoarylphosphanes are used as phosphanes of the general formula (IA).

6. The process according to claim 3, wherein phosphanes of the general formula (IA) in which all the radicals R" are identical or different and are each phenyl, cyclohexyl, cyclohexenyl, cyclopentyl, cyclopentadienyl, phenylsulphonate or cyclohexylsulphonate are used.

7. The process according to claim 3, wherein PPh$_3$, P(p-Tol)$_3$, P(o-Tol)$_3$, PPh(CH$_3$)$_2$, P(CF$_3$)$_3$, P(p-FC$_6$H$_4$)$_3$, P(p-CF$_3$C$_6$H$_4$)$_3$, P(C$_6$H$_4$—SO$_3$Na)$_3$, P(CH$_2$C$_6$H$_4$—SO$_3$Na)$_3$, P(iso-Pr)$_3$, P(CHCH$_3$(CH$_2$CH$_3$))$_3$, P(cyclopentyl)$_3$, P(cyclohexyl)$_3$, P(neopentyl)$_3$, P(C$_6$H$_5$CH$_2$)(C$_6$H$_5$)$_2$, P(NCCH$_2$CH$_2$)$_2$(C$_6$H$_5$), P[(CH$_3$)$_3$C]$_2$Cl, P[(CH$_3$)$_3$C]$_2$(CH$_3$), P(tert-Bu)$_2$(biph), P(C$_6$H$_{11}$)$_2$Cl, P(CH$_3$)(OCH$_2$CH$_3$)$_2$, P(CH$_2$=CHCH$_2$)$_3$, P(C$_4$H$_3$O)$_3$, P(CH$_2$OH)$_3$, P(m-CH$_3$OC$_6$H$_4$)$_3$, P(C$_6$F$_5$)$_3$, P[(CH$_3$)$_3$Si]$_3$ or P[(CH$_3$O)$_3$C$_6$H$_2$]$_3$, wherein Tol is tolyl, biph is biphenyl, Bu is butyl and Pr is propyl, are used as phosphanes of the general formula (IA).

8. The process according to claim 4, wherein Cl$_2$PCH$_2$CH$_2$PCl$_2$, (C$_6$H$_{11}$)$_2$PCH$_2$P(C$_6$H$_{11}$), (CH$_3$)$_2$PCH$_2$CH$_2$P(CH$_3$)$_2$, (C$_6$H$_5$)$_2$PCCP(C$_6$H$_5$)$_2$, (C$_6$H$_5$)$_2$PCH=CHP(C$_6$H$_5$)$_2$, (C$_6$F$_5$)$_2$PCH$_2$CH$_2$P(C$_6$F$_5$)$_2$, (C$_6$H$_5$)$_2$P(CH$_2$)$_4$P(C$_6$H$_5$)$_2$, (C$_6$H$_5$)$_2$PCH(CH$_3$)CH(CH$_3$)P(C$_6$H$_5$)$_2$ or (C$_6$H$_5$)$_2$PCH(CH$_3$)CH$_2$P(C$_6$H$_5$)$_2$ are used as diphosphanes of the general formula (IB).

9. The process according to claim 1, wherein a compound of the general formula (A),

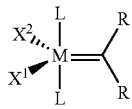

(A)

where
M is osmium or ruthenium,
the radicals R are identical or different and are each alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, or alkylsulphinyl, each of which may optionally be substituted by one or more alkyl, halogen, alkoxy, aryl or heteroaryl radicals,
$X^1$ and $X^2$ are identical or different and are two ligands, and
L are identical or different ligands,
is used as catalyst.

10. The process according to claim 9, wherein $X^1$ and $X^2$ are anionic ligands and L are uncharged electron donors.

11. The process according to claim 9, wherein $X^1$ and $X^2$ are identical or different and are each hydrogen, halogen, pseudohalogen, straight-chain or branched $C_1$-$C_{30}$-alkyl, $C_5$-$C_{24}$-aryl, $C_1$-$C_{20}$-alkoxy, $C_5$-$C_{24}$-aryloxy, $C_3$-$C_{20}$-alkyldiketonate, $C_5$-$C_{24}$-aryldiketonate, $C_1$-$C_{20}$-carboxylate, $C_1$-$C_{20}$-alkylsulphonate, $C_5$-$C_{24}$-arylsulphonate, $C_1$-$C_{20}$-alkylthiol, $C_5$-$C_{24}$-arylthiol, $C_1$-$C_{20}$-alkylsulphonyl or $C_1$-$C_{20}$-alkylsulphinyl radicals.

12. The process according to claim 9, wherein $X^1$ and $X^2$ are identical or different and are each halogen, benzoate, $C_1$-$C_5$-carboxylate, $C_1$-$C_5$-alkyl, phenoxy, $C_1$-$C_5$-alkoxy, $C_1$-$C_5$-alkylthiol, $C_5$-$C_{24}$-arylthiol, $C_5$-$C_{24}$-aryl or $C_1$-$C_5$-alkylsulphonate.

13. The process according to claim 9, wherein $X^1$ and $X^2$ are identical and are each halogen $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

14. The process according to claim 9, wherein the two ligands L are each, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

15. The process according to claim 14, wherein the imidazolidine radical (Im) has a structure of the general formula (IIa) or (IIb),

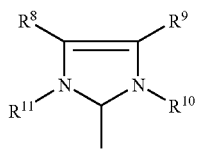

(IIa)

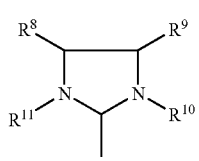

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{20}$-aryloxy, $C_2$-$C_{20}$-alkoxycarbonyl, $C_1$-$C_{20}$-alkylthio, $C_5$-$C_{20}$-arylthio, $C_1$-$C_{20}$-alkylsulphonyl, $C_1$-$C_{20}$-alkylsulphonate, $C_5$-$C_{20}$-arylsulphonate or $C_1$-$C_{20}$-alkylsulphinyl.

16. The process according to claim 1, wherein the catalyst has the structure (III) or (IV), where Cy is in each case cyclohexyl and Mes is in each case 2,4,6-trimethylphenyl

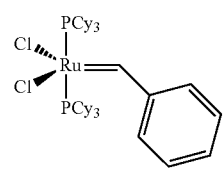

(III)

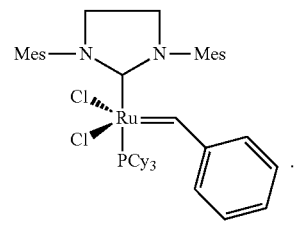

(IV)

17. The process according to claim 1, wherein a catalyst of the general formula (B),

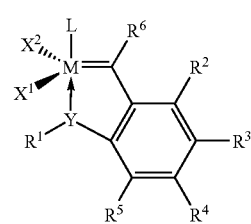

(B)

where
M is ruthenium or osmium,
Y is oxygen (O), sulphur (S), a radical N—$N^1$ or a radical P—$R^1$,
$X^1$ and $X^2$ are identical or different ligands,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals,
$R^2$, $R^3$, $R^4$ and $R^5$ are identical or different and are each hydrogen or an organic or inorganic radical,
$R^6$ is hydrogen or an alkyl, alkenyl, alkynyl or aryl radical and
L is a ligand,
is used.

18. The process according to claim 17, wherein L is a $P(R^7)_3$ radical, where the radicals $R^7$ are each, independently of one another, $C_1$-$C_6$-alkyl, $C_3$-$C_8$-cycloalkyl or aryl or else a substituted or unsubstituted imidazolidine radical ("Im") which has the structure of the general formulae

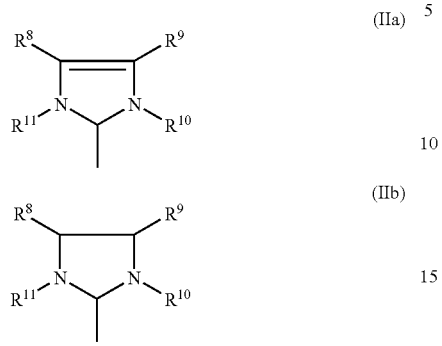

where
R$^8$, R$^9$, R$^{10}$, R$^{11}$ are identical or different and are each hydrogen, straight-chain or branched C$_1$-C$_{30}$-alkyl, C$_3$-C$_{20}$-cycloalkyl, C$_2$-C$_{20}$-alkenyl, C$_2$-C$_{20}$-alkynyl, C$_5$-C$_{24}$-aryl, C$_1$-C$_{20}$-carboxylate, C$_1$-C$_{20}$-alkoxy, C$_2$-C$_{20}$-alkenyloxy C$_1$-C$_{20}$-alkynyloxy, C$_5$-C$_{20}$-aryloxy, C$_2$-C$_{20}$-alkoxycarbonyl, C$_1$-C$_{20}$-alkylthio, C$_5$-C$_{20}$-arylthio, C$_1$-C$_{20}$-alkylsulphonyl, C$_1$-C$_{20}$-alkylsulphonate, C$_5$-C$_{20}$-arylsulphonate or C$_1$-C$_{20}$-alkylsulphinyl.

19. The process according to claim 17, wherein X$^1$ and X$^2$ in the general formula (B) are anionic ligands.

20. The process according to claim 17, wherein a catalyst of the general formula (B1),

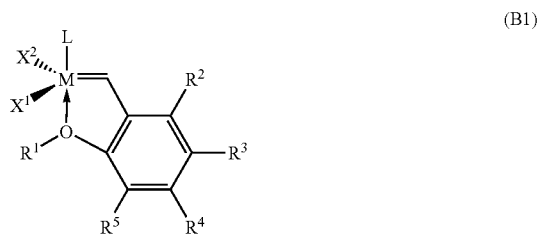

where
M, L, X$^1$, X$^2$, R$^1$, R$^2$, R$^3$, R$^4$ and R$^5$ are as defined for the general formula (B) in claim 17,
is used.

21. The process according to claim 20, wherein a catalyst of the general formula (B1) in which
M is ruthenium,
X$^1$ and X$^2$ are both halogen,
R$^1$ is a straight-chain or branched C$_1$-C$_{12}$-alkyl radical,
is used.

22. The process according to claim 20, wherein a catalyst of the general formula (B1) in which
M is ruthenium,
X$^1$ and X$^2$ are both chlorine,
R$^1$ is an isopropyl radical,
R$^2$, R$^3$, R$^4$, R$^5$ are each hydrogen and L is a substituted or unsubstituted imidazolidine radical of the formula (IIa) or (IIb),

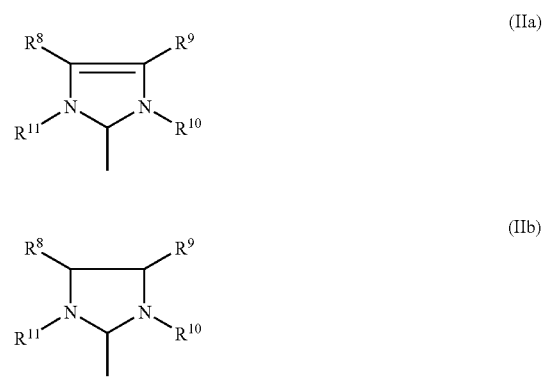

where
R$^8$, R$^9$, R$^{10}$, R$^{11}$ are identical or different and are each hydrogen, straight-chain or branched C$_1$-C$_{30}$-alkyl, C$_3$-C$_{20}$-cycloalkyl, C$_2$-C$_{20}$-alkenyl, C$_2$-C$_{20}$-alkynyl, C$_5$-C$_{24}$-aryl, C$_1$-C$_{20}$-carboxylate, C$_1$-C$_{20}$-alkoxy, C$_2$-C$_{20}$-alkenyloxy, C$_2$-C$_{20}$-alkynyloxy, C$_5$-C$_{24}$-aryloxy, C$_2$-C$_{20}$-alkoxycarbonyl, C$_1$-C$_{20}$-alkylthio, C$_5$-C$_{24}$-arylthio, C$_1$-C$_{20}$-alkylsulphonyl, C$_1$-C$_{20}$-alkylsulphonate, C$_5$-C$_{24}$-arylsulphonate or C$_1$-C$_{20}$-alkylsulphinyl,
is used.

23. The process according to claim 20, wherein a catalyst of one of the following structures (VI), (VII), (VIII), (IX), (X), (XI), (XII) or (XIII),

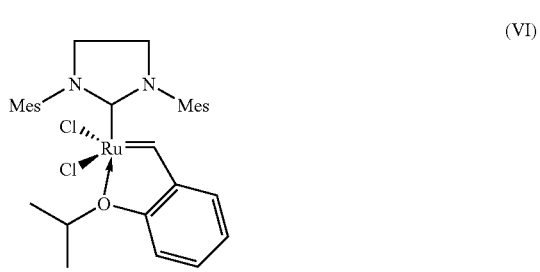

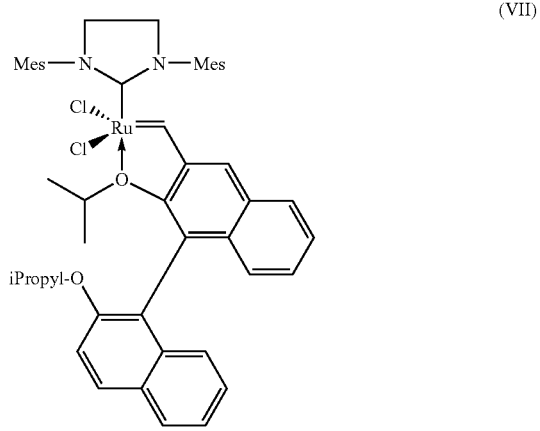

-continued

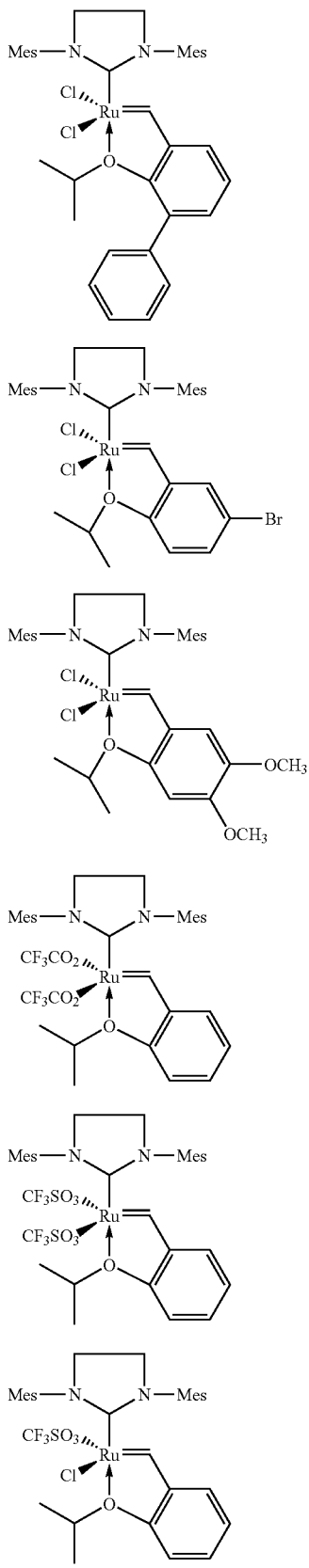

(VIII)

(IX)

(X)

(XI)

(XII)

(XIII)

where Mes is in each case a 2,4,6-trimethylphenyl radical, is used as catalyst of the general structural formula (B1).

24. The process according to claim 17, wherein a catalyst of the general formula (B2),

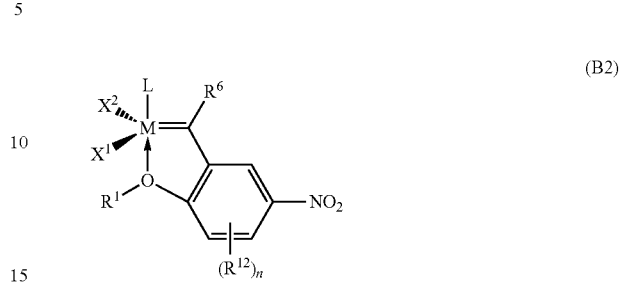

(B2)

where

M, L, $X^1$, $X^2$, $R^1$ and $R^6$ are as defined for the general formula (B) in claim 17, the radicals $R^{12}$ are identical or different and have the meanings given for the radicals $R^2$, $R^3$, $R^4$ and $R^5$ in the general formula (B) in claim 17 with the exception of hydrogen and n is 0, 1, 2 or 3, is used.

25. The process according to claim 24, wherein a catalyst of the following structures (XIV) or (XV),

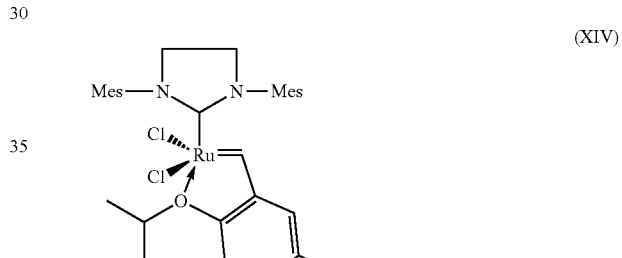

(XIV)

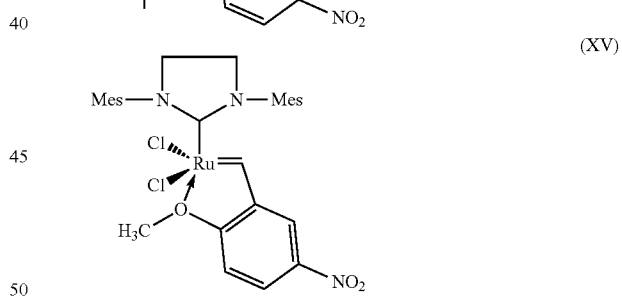

(XV)

where Mes is in each case a 2,4,6-trimethylphenyl radical, is used.

26. The process according to claim 17, wherein a catalyst of the general formula (B3),

(B3)

where $D^1$, $D^2$, $D^3$ and $D^4$ each have a structure of the general formula (XVI) which is bound via the methylene group to the silicon of the formula (B3)

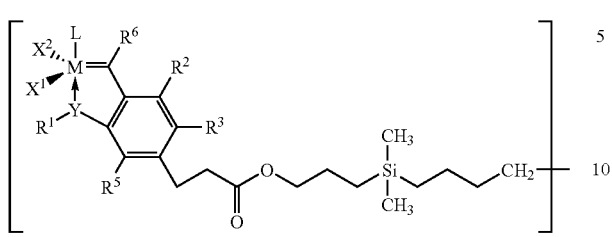

(XVI)

where

M, L, $X^1$, $X^2$, $R^1$, $R^2$, $R^3$, $R^5$ and $R^6$ are as defined for the general formula (B) in claim 17, is used.

27. The process according to claim 1, wherein a catalyst of the general formula (B4),

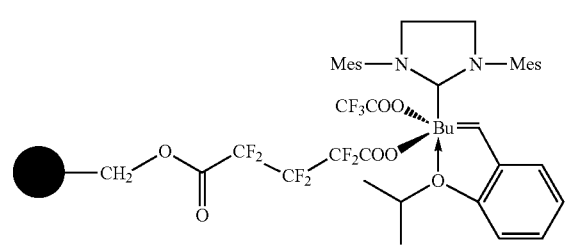

(B4)

where the symbol

is a support, is used.

28. The process according to claim 1, wherein a catalyst of the general formula (C),

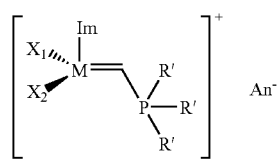

(C)

where

M is ruthenium or osmium, $X^1$ and $X^2$ are identical or different and are anionic ligands, the radicals R' are identical or different and are organic radicals, Im is a substituted or unsubstituted imidazoline radical and An is an anion, is used.

29. The process according to claim 1, where a catalyst of the general formula (D),

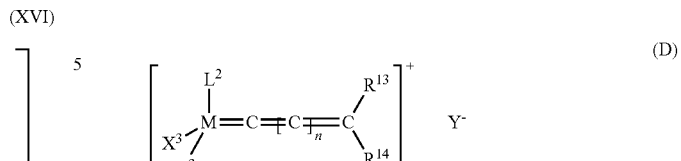

(D)

where

M is ruthenium or osmium, $R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $X^3$ is an anionic ligand, $L^2$ is an uncharged π-bonded ligand which can be either monocyclic or polycyclic, $L^3$ is a ligand from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines, stibines, ethers, amines, amides, imines, sulphoxides, thioethers and pyridines, $Y^-$ is a noncoordinating anion and n is 0, 1, 2, 3, 4 or 5, is used.

30. The process according to claim 1, wherein a catalyst of the general formula (E),

(E)

where $M^2$ is molybdenum or tungsten, $R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_5$-$C_{24}$-aryl, $C_1$-$C_{20}$-carboxylate, $C_1$-$C_{26}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl, $R^{17}$ and $R^{18}$ are identical or different and are each a substituted or halogen-substituted $C_1$-$C_{20}$-alkyl, $C_5$-$C_{24}$-aryl, $C_6$-$C_{30}$-aralkyl radical or silicon-containing analogues, is used.

31. The process according to claim 1, wherein a catalyst of the general formula (F),

(F)

where

M is ruthenium or osmium, $X^1$ and $X^2$ are identical or different and are anionic ligands, L are identical or different ligands, $R^{19}$ and $R^{20}$ are identical or different and are each hydrogen or substituted or unsubstituted alkyl, is used.

32. The process for producing hydrogenated nitrile rubber, wherein the metathetic degradation of nitrile rubber according to claim 1 is followed by a hydrogenation of the nitrile rubber degraded by metathesis.

33. The process according to claim 13, wherein $X^1$ and $X^2$ are identical and are chlorine.

34. The process according to claim 19, wherein $X^1$ and $X^2$ in the general formula (B) are identical or different and are each hydrogen, halogen, pseudohalogen, straight-chain or branched $C_1$-$C_{30}$-alkyl, $C_5$-$C_{24}$-aryl, $C_1$-$C_{20}$-alkoxy, $C_5$-$C_{24}$-aryloxy, $C_3$-$C_{20}$-alkyldiketonate, $C_5$-$C_{24}$-aryldiketonate, $C_1$-$C_{20}$-carboxylate, $C_1$-$C_{20}$-alkylsulphonate, $C_5$-$C_{24}$-arylsulphonate, $C_1$-$C_{20}$-alkylthiol, $C_5$-$C_{24}$-arylthiol, $C_1$-$C_{20}$-alkylsulphonyl or $C_1$-$C_{20}$-alkylsulphinyl radicals.

35. The process according to claim 19, wherein $X^1$ and $X^2$ in the general formula (B) are identical or different and are each halogen, benzoate, $C_1$-$C_5$-carboxylate, $C_1$-$C_5$-alkyl, phenoxy, $C_1$-$C_5$-alkoxy, $C_1$-$C_5$-alkylthiol, $C_5$-$C_{24}$-arylthiol, $C_5$-$C_{24}$-aryl or $C_1$-$C_5$-alkylsulphonate.

36. The process according to claim 19, wherein $X^1$ and $X^2$ in the general formula (B) are identical and are each halogen, $CF_3COO$, $CH_3COO$, $CFH_2COO$, $(CH_3)_3CO$, $(CF_3)_2(CH_3)Co$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

37. The process according to claim 31 wherein $X^1$ and $X^2$ are anionic ligands and L are uncharged electron donors.

* * * * *